United States Patent
Oyama et al.

(10) Patent No.: US 10,866,723 B2
(45) Date of Patent: Dec. 15, 2020

(54) INFORMATION PROCESSOR, NON-TRANSITORY COMPUTER-READABLE MEDIUM, AND GAME CONTROL METHOD

(71) Applicant: Universal Entertainment Corporation, Tokyo (JP)

(72) Inventors: Masaki Oyama, Tokyo (JP); Atsushi Kumita, Tokyo (JP); Toshikazu Jinnouchi, Tokyo (JP)

(73) Assignee: UNIVERSAL ENTERTAINMENT CORPORATION, Tokyo (JP)

(*) Notice: Subject to any disclaimer, the term of this patent is extended or adjusted under 35 U.S.C. 154(b) by 0 days.

(21) Appl. No.: 16/137,499

(22) Filed: Sep. 20, 2018

(65) Prior Publication Data

US 2019/0095070 A1    Mar. 28, 2019

(30) Foreign Application Priority Data

Sep. 27, 2017   (JP) .................... 2017-185704

(51) Int. Cl.
   *G06F 3/0482*   (2013.01)
   *G06F 3/0488*   (2013.01)
   (Continued)

(52) U.S. Cl.
   CPC ............ G06F 3/0488 (2013.01); A63F 13/00 (2013.01); G06F 3/0485 (2013.01); G06F 3/04817 (2013.01)

(58) Field of Classification Search
   CPC .................................................. G06F 3/0482
   (Continued)

(56) References Cited

U.S. PATENT DOCUMENTS

| 6,922,634 B2* | 7/2005 | Odakura | G01S 19/13 340/539.13 |
| 2003/0043196 A1* | 3/2003 | Gibson | G06F 3/14 715/776 |

(Continued)

FOREIGN PATENT DOCUMENTS

| JP | 2003099176 A | * | 4/2003 |
| JP | 2017060703 A |   | 3/2017 |

OTHER PUBLICATIONS

JP 2003099176 A—English Translation of Abstract (Year: 2003).*
(Continued)

*Primary Examiner* — Daniel Rodriguez
(74) *Attorney, Agent, or Firm* — Potomac Law Group, PLLC; Kenneth Fagin

(57) ABSTRACT

The present invention provides an information processor, a game program, and a game control method. It is able to adjust a repeated frequency of a bonus game easily. An information processing unit 1 comprises a display 2 for displaying a screen and a touch panel 5 for receiving a touch input of a user. The information processing unit 1 displays a displaying area 21 set based on the screen in a map 20 which has a plurality of node icons 22 on the path, displays a current position indicating icon 24, sets the current position based on a certain node icon 22 of the plurality of node icons 22 in a case of the node icon being touched, and displays the displaying area 21 in which the node icon 22 set to be the current position is located in the map 20 in a case of the current position indicating icon 24 being touched.

4 Claims, 14 Drawing Sheets

(51) Int. Cl.
*G06F 3/0481* (2013.01)
*G06F 3/0485* (2013.01)
*A63F 13/00* (2014.01)

(58) Field of Classification Search
USPC .......................................................... 715/863
See application file for complete search history.

(56) References Cited

U.S. PATENT DOCUMENTS

| | | | | |
|---|---|---|---|---|
| 2004/0003351 | A1* | 1/2004 | Sommerer | G06F 16/955 715/251 |
| 2005/0257400 | A1* | 11/2005 | Sommerer | G06F 16/954 36/13 |
| 2005/0268253 | A1* | 12/2005 | Johnson | G06F 3/0482 715/841 |
| 2009/0172599 | A1* | 7/2009 | Nezu | G01C 21/3614 715/841 |
| 2012/0109516 | A1* | 5/2012 | Miyazaki | G09B 29/102 701/428 |
| 2013/0167075 | A1* | 6/2013 | Chanda | G06F 3/0481 715/800 |
| 2014/0080556 | A1* | 3/2014 | Knutsson | A63F 13/2145 463/7 |
| 2014/0135104 | A1* | 5/2014 | Knutsson | G07F 17/32 463/24 |
| 2014/0274382 | A1* | 9/2014 | Green | G07F 17/3274 463/31 |
| 2014/0274418 | A1* | 9/2014 | Knutsson | A63F 13/80 463/43 |
| 2014/0365120 | A1* | 12/2014 | Vulcano | G01C 21/3617 701/532 |
| 2014/0370950 | A1* | 12/2014 | Hansson | A63F 13/23 463/9 |
| 2015/0174488 | A1* | 6/2015 | Dancau | A63F 13/57 463/9 |
| 2015/0174489 | A1* | 6/2015 | Evald | A63F 13/47 463/31 |
| 2015/0237473 | A1* | 8/2015 | Koepke | H04W 4/021 455/456.3 |
| 2015/0298004 | A1* | 10/2015 | Villoria | A63F 13/46 463/42 |
| 2015/0321099 | A1* | 11/2015 | Knuttson | A63F 3/0423 463/31 |
| 2016/0048286 | A1* | 2/2016 | Picon | G06K 9/2054 463/33 |
| 2016/0127486 | A1* | 5/2016 | Chen | G06F 3/04842 709/206 |
| 2016/0129349 | A1* | 5/2016 | Zhao | A63F 13/537 463/31 |
| 2016/0138932 | A1* | 5/2016 | Ichinokawa | G01C 21/3614 701/454 |
| 2017/0087466 | A1* | 3/2017 | Knutsson | A63F 13/88 |
| 2017/0087467 | A1* | 3/2017 | Knutsson | A63F 13/795 |
| 2017/0092057 | A1* | 3/2017 | Knutsson | G07F 17/3227 |
| 2018/0180436 | A1* | 6/2018 | Shibata | G01C 21/3676 |
| 2018/0181633 | A1* | 6/2018 | Imamura | G06T 1/0007 |
| 2019/0270013 | A1* | 9/2019 | Villoria | A63F 13/44 |

OTHER PUBLICATIONS

Christian Boyce, "Eight tips for IOS's Maps app", available on Mar. 23, 2012, available at <<https://friendsofmaconfb.wordpress.com/2012/03/23/eight-tips-for-ioss-maps-app-macworld/>> (pp. 1-2)<<https://www.pcworld.com/article/1165393/eight_tips_for_ioss_maps_app.html#lsrc.twt_macworld>> (pp. 3-8) (Year: 2012).*

* cited by examiner

FIG.8
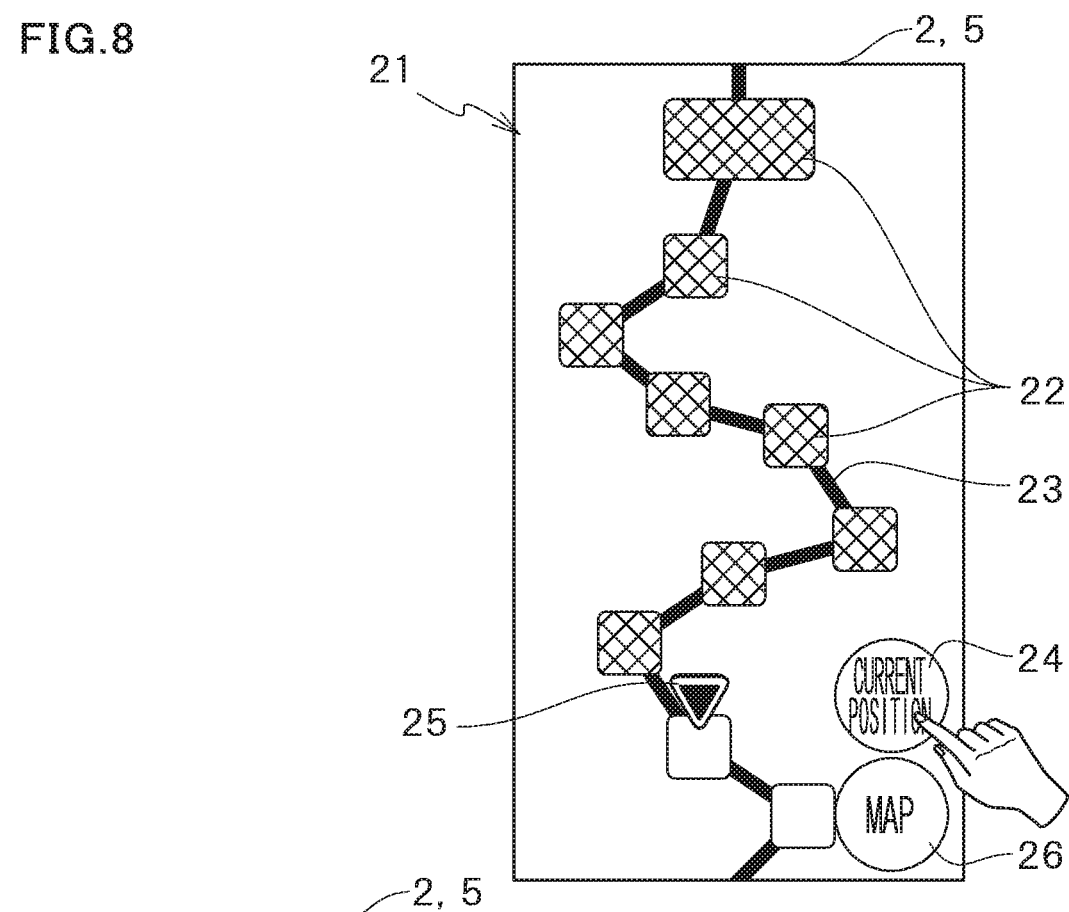
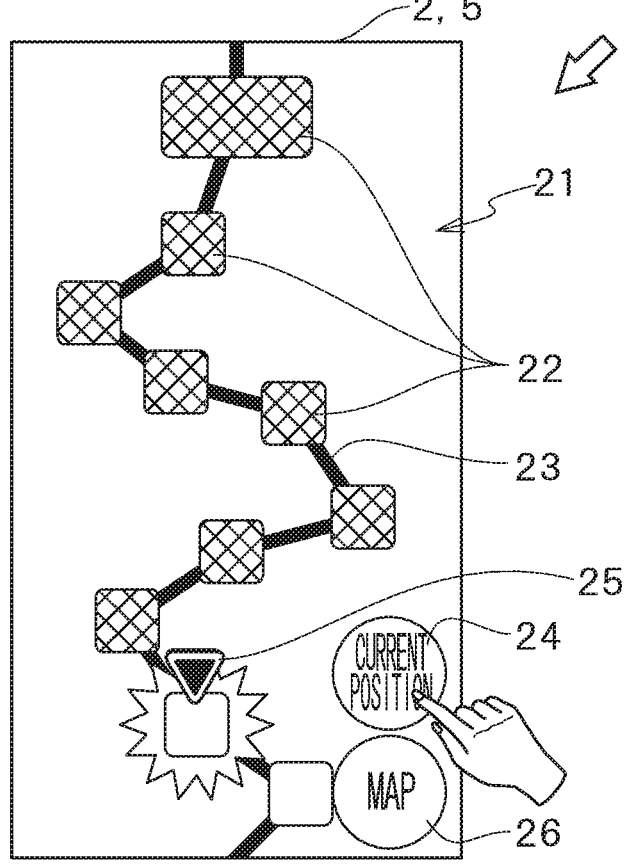

INFORMATION PROCESSOR, NON-TRANSITORY COMPUTER-READABLE MEDIUM, AND GAME CONTROL METHOD

CROSS-REFERENCE TO RELATED APPLICATION

This application claims the benefit of Japanese Pat. App. No. 2017-185704, filed on Sep. 27, 2017, which application is incorporated herein by reference in its entirety.

BACKGROUND OF THE INVENTION

1. Field of Invention

The present invention relates to an information processor, a non-transitory computer-readable medium, and a game control method.

2. Description of Related Art

In the past, there is a game, which occurs game elements based on a map displayed in the game. For example, there is a game in a game machine in the specification (Japanese Unexamined Patent Application Publication No. 2017-060703) in which a map constituted of a plurality of stages is displayed in one screen and the stage is performed by selecting a option prompted by various stages.

In recent years, a game is provided in a tablet or a smartphone etc. whose screen is smaller than that of a dedicated gaming machine. In such information processor, since it is very difficult to display a large map in one screen, a part of the map is generally displayed in a scrollable way through a touch input such as swiping.

However, in a case of displaying a desired displaying position, the touch input such as swiping is needed to perform repeatedly for many times sometimes, and how to improve a user interface in a game which performs an operation mainly through a touch panel in a tablet, smartphone and the like is a problem.

BRIEF SUMMARY OF THE INVENTION

Therefore, an object of the present invention is to provide an information processor, a non-transitory computer-readable medium storing a game program, and a game control method, which may improve a user interface in the information processor comprising a touch panel.

The information processor of the present invention comprises:
a display for displaying a screen;
a touch panel disposed at an overall surface of the display and receiving a touch input of a user; and
a controller,
the controller being programmed to perform:
a process of displaying a displaying area set based on a screen on the display in a map which has a plurality of node icons on a path;
a process of displaying an indicating icon on the display;
a process of setting a certain one of the plurality of node icons to be a current position based on the node icon, in a case that an operation received by the touch panel is determined to be an operation denoting the certain one of the plurality of node icons; and
a process of displaying a displaying area in which the node icon set to be the current position in the map is located, in a case that an operation received by the touch panel is determined to be an operation denoting the indicating icon.

According to the structure mentioned above, in the map, even in a case of that the displaying area is farther from a node icon which is set to be the current position, the displaying area for which the node icon is set to be the current position is displayed through performing an operation denoting the indicating icon. Therefore, there is no need to search for the node icon which is set to be the current position, and it is easy to display the node icon which is set to be the current position. As a result, it is able to improve the user interface in the information processor which comprises a touch panel.

In the information processor of the present invention, it is preferably configured that the controller performs a scroll displaying until displaying the set displaying area, in a case that an operation received by the touch panel is determined to be an operation denoting the indicating icon.

According to the structure mentioned above, in a case of returning the current position using the indicating icon, the scroll displaying is performed until the displaying area of the current position, and thus it is able to cause the user to recognize how far the current position is away. Therefore, when the user wants to access a position before returning the current position again, the user is able to take the direction, the time and the like of the scroll displaying as an indication to understand the position before returning. As a result, it is able to further improve the user interface in the information processor which comprises a touch panel.

In the information processor of the present invention, it is preferably configured that the controller sets a displaying area in the map in such a way that the node icon set to be the current position is located at a center position in a direction of the scroll, in a case that an operation received by the touch panel is determined to be an operation denoting the indicating icon.

According to the structure mentioned above, in a case of using the indicating icon, the displaying area is set in such a way that the current position is located at a center position. Therefore, in a case of displaying the displaying area in which the current position is located by using the indicating icon, it is able to easily find the current position in the displaying area.

In the information processor of the present invention, it is preferably configured that the controller cancels the scroll displaying based on the operation when the current displaying area includes the node icon set to be the current position, in a case that an operation received by the touch panel is determined to be an operation denoting the indicating icon.

According to the structure mentioned above, in a case of returning the current position using the indicating icon, when the displaying area in which the current position is located has been displayed, the scroll displaying is not performed. Therefore, it is able to inform that the displaying area in which the current position is located has been displayed clearly.

In the information processor of the present invention, the node icon is further highlighted, in a case of canceling the scroll displaying.

According to the structure mentioned above, in a case of returning the current position using the indicating icon by the user, when the displaying area in which the current position is located has been displayed, the scroll displaying is not performed but the node icon of the current position is highlighted. Therefore, it is able to inform of the location of the current position in the displaying area which has been displayed clearly.

The present invention relates to a non-transitory computer-readable medium storing a game program which causes a computer comprising a display for displaying a screen and a touch panel disposed at an overall surface of the display and receiving a touch input of a user to perform:

a process of displaying a displaying area set based on a screen on the display in a map which has a plurality of node icons on a path;

a process of displaying an indicating icon on the display;

a process of setting a certain one of the plurality of node icons to be a current position based on the node icon, in a case that an operation received by the touch panel is determined to be an operation denoting the certain one of the plurality of node icons; and a process of displaying a displaying area in which the node icon set to be the current position in the map is located, in a case that an operation received by the touch panel is determined to be an operation denoting the indicating icon.

According to the structure mentioned above, in the map, even in a case of that the displaying area is farther from a node icon which is set to be the current position through a scroll operation, the displaying area for which the node icon is set to be the current position is displayed through performing an operation denoting the indicating icon. Therefore, there is no need to search for the node icon which is set to be the current position through repeatedly performing the scroll operation, and it is able to display the node icon which is set to be the current position easily and improve the user interface in the information processor which comprises the touch panel.

A game control method of the present invention performed by a computer, the computer comprising a displaying for displaying a screen and a touch panel disposed at an overall surface of the display and receiving a touch input of a user, the method comprising the steps of:

displaying a displaying area set based on a screen on the display in a map which has a plurality of node icons on a path;

displaying an indicating icon on the display;

setting a certain one of the plurality of node icons to be a current position based on the node icon, in a case that an operation received by the touch panel is determined to be denoting the certain one of the plurality of node icons; and displaying a displaying area in which the node icon set to be the current position in the map is located, in a case that an operation received by the touch panel is determined to be an operation denoting the indicating icon.

According to the structure mentioned above, in the map, even in a case of that the displaying area is farther from a node icon which is set to be the current position through a scroll operation, the displaying area for which the node icon is set to be the current position is able to be displayed through performing an operation denoting the indicating icon. Therefore, there is no need to search for the node icon which is set to be the current position through repeatedly performing the scroll operation, and it is able to display the node icon which is set to be the current position easily and improve the user interface in the information processor which comprises the touch panel.

The present invention is able to improve the user interface in the information processor which comprises a touch panel.

BRIEF DESCRIPTION OF THE DRAWINGS

FIG. 8 is a diagram representing an example of a display screen of the information processor.

DETAILED DESCRIPTION OF THE PREFERRED EMBODIMENT

The information processor of the present invention is illustrated based on the drawings.

(Information Processor: Display Outline)

Figure 1:
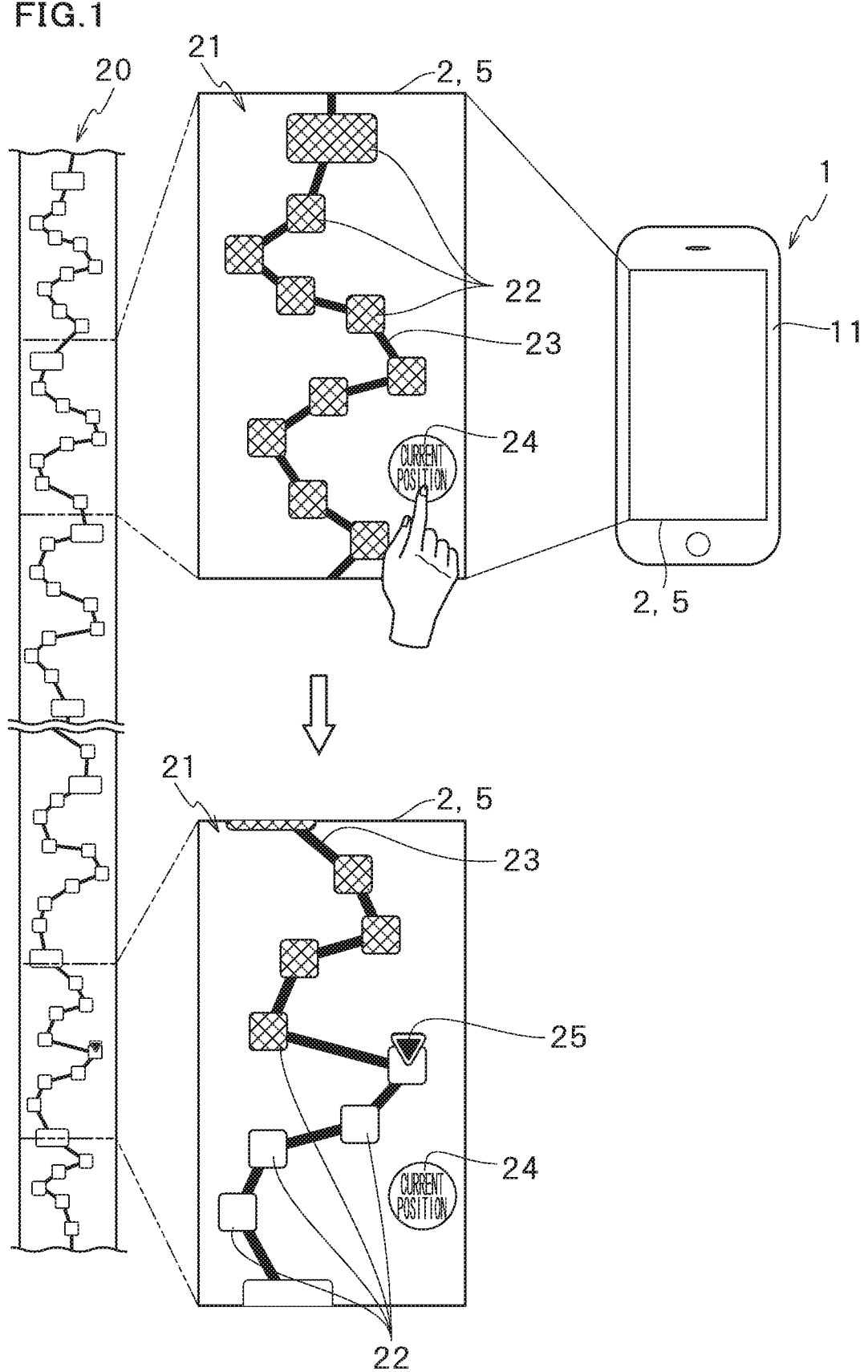
FIG. 1 is an illustrative view representing an operation state of an information processor.

As shown in FIG. 1, the information processor 1 is configured to display the location of the current proceeding position by one touch input, regardless of which position of the map scroll-displayed is displayed.

In more detail, the information processor 1 comprises a display 2 provided on the front surface of the casing 11 and a touch panel 5 provided on the entire surface of the display 2. In addition, the information processor 1 comprises a memory 3 and a controller 4 to be described later. The information processor 1 may be portable or desktop. Examples of the portable information processor 1 include a portable information device such as a portable computer or a laptop computer, a notebook computer, a tablet-type personal computer, a hand-held type personal computer, a PDA (Personal Data Assistant), and a smartphone.

The display 2 is configured to be able to display images. The display method of the display 2 is, for example, liquid crystal, organic electroluminescence, CRT (Cathode Ray Tube), and plasma. The touch panel 5 is configured to be able to detect the coordinates of the site where the user's finger and the like touch. The touch panel 5 employs the known technique such as the electromagnetic induction method and the electrostatic capacitance method. The information processor 1 determines the object (a node icon 22, a current position indicating icon 24 and the like, which will be described later) on the screen touched by the user and the touch state such as a swipe based on the coordinates detected by the touch panel 5, and performs a response corresponding to the determination result.

In addition, in the following description, when the display 2 is viewed from the front, the lower end direction is referred to as "lower direction" or simply as "lower", the upper end direction is referred to as "upper direction" or simply as "upper", the left end direction is referred to as "left direction" or simply as "left", and the right end direction is referred to as "right direction" or simply as "right".

In addition, in the following description, when it is described that a certain object (for example, the node icon 22 to be described later) is selected by user, it means that the information processor 1 determines that a certain object is selected based on the operation of a user received by the touch panel 5.

In addition, in the present embodiment, the touch panel 5 operates as an input device and receives an operation such as a swipe operation or a touch input, but is not limited thereto. For example, as an input device, it can be a microphone or a camera, and also can receive user's voice and gesture as an indicating operation.

In the display 2, a part of the map 20 including a plurality of node icons 22 on a path 23 is displayed as a displaying area 21 as the map screen. The map 20 is an image stored in a storage device (a memory 3 and the like described later) of the information processor 1, and a plurality of node icons 22 on path 23 are set as selectable objects. The displaying area 21 displays a part of the map 20, which is set to correspond to a screen range that display 2 can display. In the map screen, in addition to the displaying area 21, the current position indicating icon 24 is always displayed as an object that can be selected.

When a certain node icon 22 is selected, one node icon 22 selected based on this node icon 22 is set to be the current position. In the present embodiment, the selected node icon 22 is set to be the current position, but is not limited thereto. For example, it is also possible to set the next node icon 22 of the selected node icon 22 to be the current position. When the current position indicating icon 24 is selected, a displaying area 21 in which the node icon 22 which is set to be the current position is located is displayed.

Therefore, in the map screen, even in a case of that the displaying area 21 is farther from the node icon 22 which is set to be the current position, the displaying area 21 for which the node icon 22 is set to be the current position is able to be displayed through performing an operation denoting the current position indicating icon 24. Therefore, there is no need to search for the node icon 22 which is set to be the current position, and it is easy to display the node icon 22 which is set to be the current position. As a result, it is able to improve the user interface in the information processor 1 which comprises a touch panel.

Figure 2:
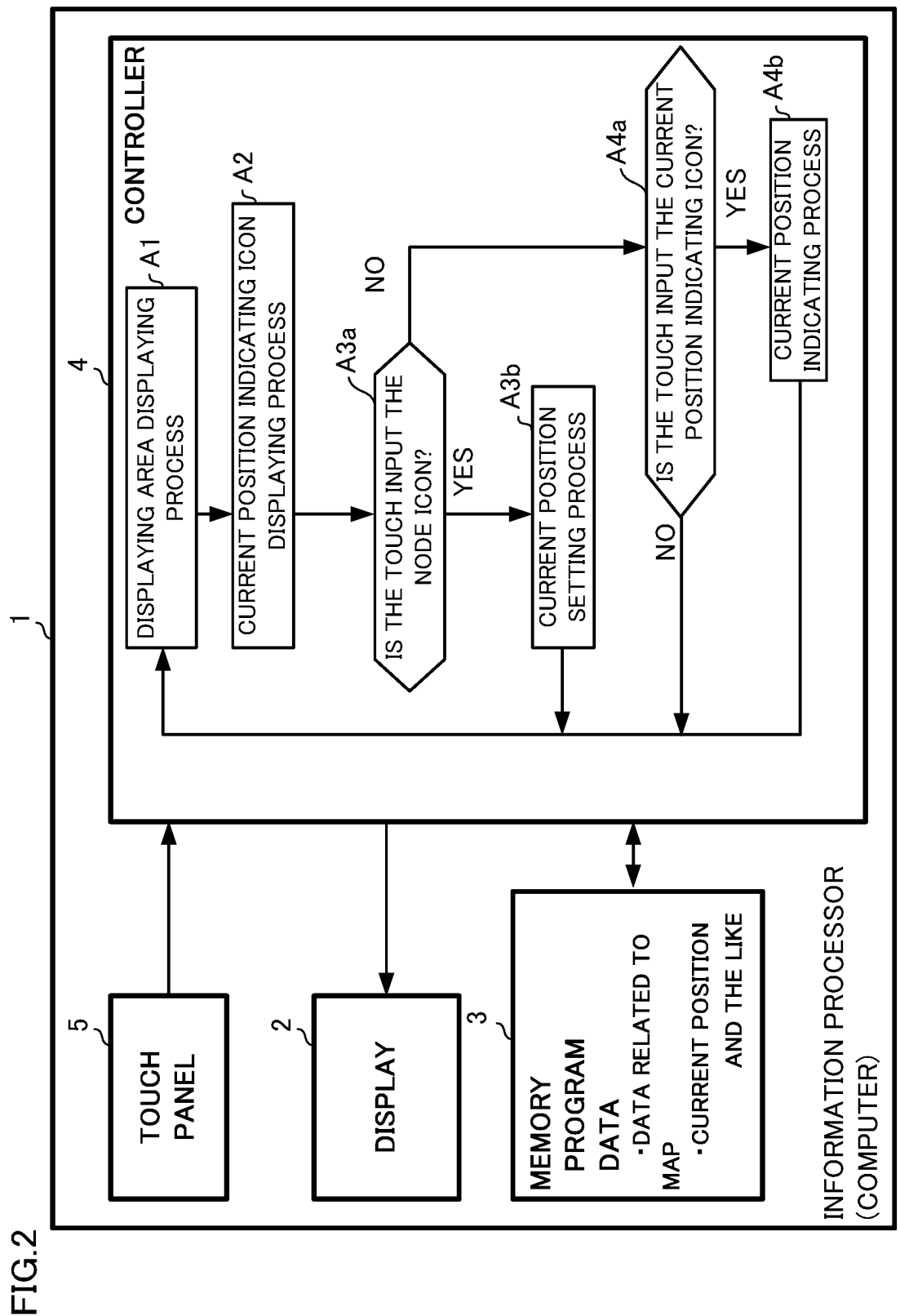
FIG. 2 is an illustrative view representing an outline structure of the information processor.

As shown in FIG. 2, the information processor 1 as a computer comprises a display 2, a memory 3, a controller 4, and a touch panel 5.

The memory 3 stores various programs including a game program executed by the controller 4, and various data used by the various programs. For example, the memory 3 stores data related to the map 20. That is, the memory 3 stores an image data of the map 20, a position data of an object of the node icon 22 corresponding to the coordinates of the map 20, an order of progress of the respective node icons 22, a game element corresponding to each node icon 22, a data denoting the node icon 22 which is set to be the current position, and a data denoting the current displaying area 21 and the like. The data and program in the memory 3 may be stored in advance at the stage of factory shipment, or may be downloaded from an unillustrated server or the like via communication means and stored. The communication means may be an interactive communication passage such as the Internet and a cable TV, or may be one-way broadcasting.

Alternatively, the data and program stored in the memory 3 may be stored in a recording medium such as a floppy disk, a CD-ROM, a DVD-ROM, an MO (optical magnetic disc), and a flash memory, and may be read from the recording medium and installed in the memory according to need.

The controller 4 executes the following process based on the game program stored in the memory 3. That is, the controller 4 is programmed in such a way that the following process is executed. In other words, the game program stored in the memory 3 causes the information processor 1 to execute the following process. More specifically, the controller 4 executes: a process (A1) of displaying the displaying area 21 set correspondingly to the screen in the display 2, in the map 20 having a plurality of node icons 22 on the path; a process (A2) of displaying the current position indicating icon 24 in the display 2; and for the operation received by the touch panel 5, when it is determined to be an operation in which one of the plurality of node icons 22 is displayed (A3a), a process of setting the one of the plurality of node icons 22 to be the current position based on this node icon 22 (A3b); and for the operation received by the touch panel 5, when it is determined to be an operation denoting the current position indicating icon 24 (A4a), a process of displaying the displaying area 21 in which the node icon 22 which is set to be the current position is located in the map 20 is displayed (A4b).

In this way, in the map 20, even in a case of that the displaying area 21 is farther from the node icon 22 which is set to be the current position, the displaying area 21 for which the node icon 22 is set to be the current position is able to be displayed through performing an operation denoting the current position indicating icon 24. Therefore, there is no need to search for the node icon 22 which is set to be the current position, and it is easy to display the node icon 22 which is set to be the current position. As a result, it is able to improve the user interface in the information processor 1 which comprises the touch panel 5.

In addition, the game control method in which the processes of (A1)~(A4) executed by the information processor 1 (computer) can be realized through performing the processes of (A1)~(A4) by the information processor 1 including the above program. In other words, the information processor 1 includes a plurality of processors that execute the processes of (A1)~(A4) respectively. In addition, in the following description, the information processor 1 will be used for description, however, the process and operation of the information processor 1 may be replaced with the invention of a program or game control method. In addition, the process executed by the controller may be executed by a server connected to a plurality of information processors 1 so as to be communicable with each other, and may be distributedly executed in the information processor 1 and the server. That is, the process and operation of the information processor 1 may be replaced with the invention of a game system which comprises a server and a plurality of information processors 1.

In addition, the information processor 1 may be associated with the displaying of the displaying area 21 in which the current position is located when a user uses the current position indicating icon 24, and comprise the following structure. That is, the information processor 1 may further perform a scroll displaying until a process of the set displaying area, in a case of the controller 4 determining that an operation received by the touch panel 5 is an operation denoting the indication of the current position indicating icon 24.

In this way, in a case of returning the current position using the current position indicating icon 24, the scroll displaying is performed until the displaying area of the current position, and thus it is able to cause the user to recognize how far the current position is away. Therefore, when the user wants to access a position before returning the current position again, the user is able to take the direction, the time and the like of the scroll displaying as an indication to understand the position before returning. As a result, it is able to further improve the user interface in the information processor 1 which comprises a touch panel.

In addition, the information processor 1 may be also associated with the displaying of the node icon 22 which is set to be current position when the current position indicating icon 24 is selected, and comprise the following structure. That is, the information processor 1 may further perform a process of setting the displaying area 21 in the map 20 in such a way that the node icon 22 which is set to be the current position is located at a center position in the direction of the scroll, in a case of the controller 4 determining that an operation received by the touch panel 5 is an operation denoting the indication of the current position indicating icon 24.

In this way, in a case of using the current position indicating icon 24, the displaying area 21 is set in such a way that the node icon 22 of the current position is located at a center position. Therefore, in a case of displaying the displaying area in which the current position is located by using the indicating icon, it is able to easily find the current position in the displaying area.

In addition, the information processor 1 may further perform a process of canceling the scroll displaying based on an operation in a case of the controller 4 determining that the operation received by the touch panel 5 is the operation denoting the indication of the current position indicating icon 24, that is, when the current displaying area 21 includes the node icon which is set to be the current position.

In this way, in a case of returning the current position using the current position indicating icon 24, when the displaying area 21 in which the current position is located has been displayed, the scroll displaying is not performed. Therefore, it is able to inform that the displaying area 21 in which the current position is located has been displayed clearly.

In addition, the information processor 1 may further perform a process of highlighting the node icon, in a case of the controller 4 canceling the scroll displaying. In this way, in a case of returning the current position using the current position indicating icon 24 by the user, when the displaying area 21 in which the current position is located has been displayed, the scroll displaying is not performed but the node icon 22 of the current position is highlighted. Therefore, it is able to inform of the location of the current position in the displaying area 21 which has been displayed clearly.

(Information Processor 1: Specific Example: Electric Structure)

Figure 3:
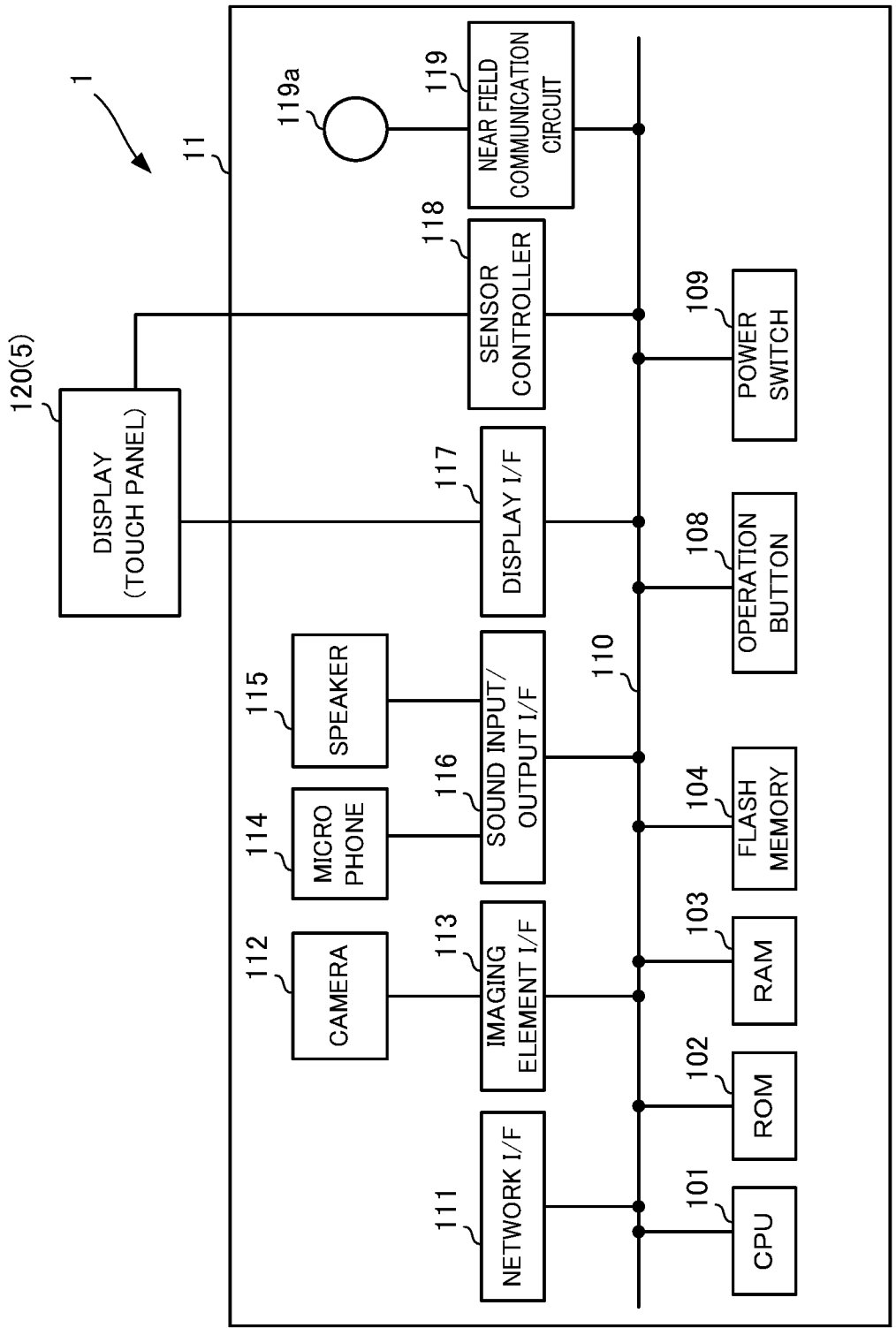
FIG. 3 is a block diagram representing an electric structure of the information processor.

As shown in FIG. 3, the information processor 1 includes, in a casing 11, a CPU 101, a ROM 102, a RAM 103, a flash memory 104, an operation button 108, a power switch 109, a bus line 110, a network I/F 111, a camera 112, an imaging element I/F 113, a microphone 114, a speaker 115, a sound input/output OF 116, a display I/F 117, a sensor controller 118, a near field communication circuit 119, and an antenna 119a of the near field communication circuit 119.

The CPU (Central Processor) 101 functions as a main structure of the controller 4 and controls the entire information processor 1. The ROM (Read Only Memory) 102 stores programs used for driving the CPU 101, such as an IPL (Initial Program Loader) The ROM 102 may store the program for executing the processes (A1) to (A4).

The RAM (Random Access Memory) 103 is used as a work area of the CPU 101. The flash memory 104 stores the game program for executing the processes (A1) to (A4) shown in FIG. 2, a program for communication, and plural sets of data such as image data and sound data. For example, the CPU 101 stores the entire image of the map 20 in the RAM 103, and selects and displays the area corresponding to the user's swipe operation or the like as the displaying area 21 in real time. The operation button 108 is used for, for example, initial setting of the information processor 1. The power switch 109 is used for turning on/off the power source of the information processor 1.

The network OF (Interface) 111 is an interface for performing data communication by utilizing a communication network such as the Internet. The camera 112 is a built-in camera image capturing means which captures an image of an object to obtain image data under the control of the CPU 101. The imaging element I/F 113 is a circuit for controlling the camera 112. The microphone 114 is a built-in sound collection means to which sound is input. The sound input/output I/F 116 is a circuit for processing input and output of a sound signal between the microphone 114 and the speaker 115 under the control of the CPU 101. The display I/F 117 is a circuit for sending image data to the display 120 under the control of the CPU 101. The display 120 is provided on the front surface of the casing 11. The sensor controller 118 is a circuit for receiving an input from the touch panel 5 of the display 120. The near field communication circuit 119 is a communication circuit based on NFC (Near Field Communication) (Registered Trademark). Bluetooth (Registered Trademark), or the like. The bus line 110 is an address bus, a data bus, or the like for electrically connecting the components such as the CPU 101.

(Information Processor 1: Display Screen)

Figure 4:
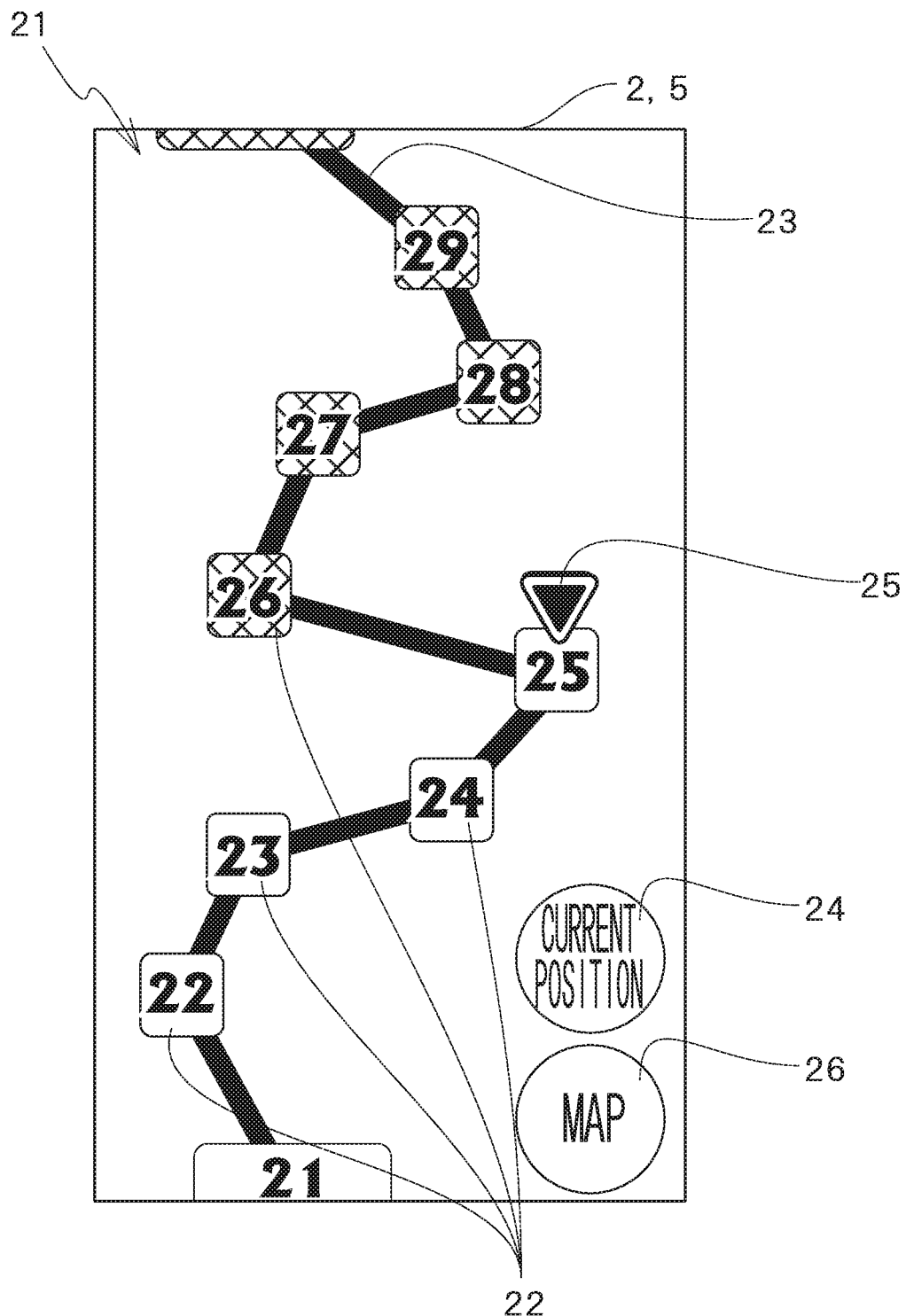
FIG. 4 is a diagram representing an example of a display screen of the information processor.

Next, the screen displayed in the display 2 is illustrated. FIG. 4 is a diagram representing an example of a map screen displayed in the display 2. As shown in FIG. 4, in the map screen, a part of the map 20 including a plurality of node icons 22 on a path 23 is displayed as a displaying area 21. That is, the path 23 is displayed by the set of edges connecting the node icons 22 to each other. In addition, as described later in detail, the current position indicating icon 24 and the map icon 26 are always displayed on the bottom right of the map screen.

The node icon 22 is an icon representing the degree of progress in the map 20. In the present embodiment, in the map 20, a path 23 which is meandered from the lower edge to the upper edge is provided, but is not limited thereto. In the node icon 22, the order of progress is preset in an order of reaching from the lowermost end along the path 23. That is, the order of progress of the node icon 22 refers to presenting the progress of the game for the user. In the present embodiment, a number corresponding to the order of progress is attached to the node icon 22. As a result, the progress of a game can be indicated to the user by the number.

The user can select the node icon 22 allowed according to the order of progress. The selection means, for example, that the information processor 1 occurs a game element or the like related to the node icon 22 when the node icon 22 is touched input in the displaying area 21. In addition, "according to the order of progress" means, for example, that occurring a game element related to a certain node icon 22 is present as a condition, and the next node icon 22 of this node icon 22 in the order is allowed to be selected and the like.

The game element refers to an element that can be played in the game started by the controller 4 (CPU 101) and an element outputting a result by the operation of the user. For example, in the present embodiment, a slot game can be executed as a game element within a game. In addition, the game element is not limited thereto, and may be a card game such as a poker or baccarat, a roulette game, a pachinko game, a pachinko slot game and the like.

The occurring of the game element refers to a case where a game element corresponding to the node icon 22 is executed in the game and a case where a predetermined condition is satisfied when a game element corresponding to the node icon 22 is executed in the game or the like. In addition, in the present embodiment, in selecting the node icon 22 by a user and therefore performing the slot game, the next node icon 22 is allowed to be selected when the predetermined condition is satisfied, but is not limited thereto. In addition, as shown in FIG. 4, the node icon 22 that does not satisfy the predetermined condition is displayed in a grayout background. In addition, the slot game will be described later.

In this way, a plurality of node icons 22 can be selected by a user. When one of a plurality of node icons 22 is selected by a user, the one of a plurality of node icons 22 is set to be the current position based on this node icon 22. The current position icon 25 is displayed in the node icon 22 which is set to be the current position. The setting of the current position is maintained until a different node icon 22 is selected by the user. In the present embodiment, the last selected node icon 22 by the user is set to be the current position, but is not limited thereto. For example, it is also possible to set the last node icon 22 which is allowed to be selected in the order of progress to be the current position. In addition, the node icon 22 may be further set to be the current position by the user. In this way, the information processor 1 sets one node icon 22 of the plurality of node icons 22 as the current position according to the touch input history of the user.

(Information Processor 1: Display Screen: Change of the Displaying Area)

Figure 5:
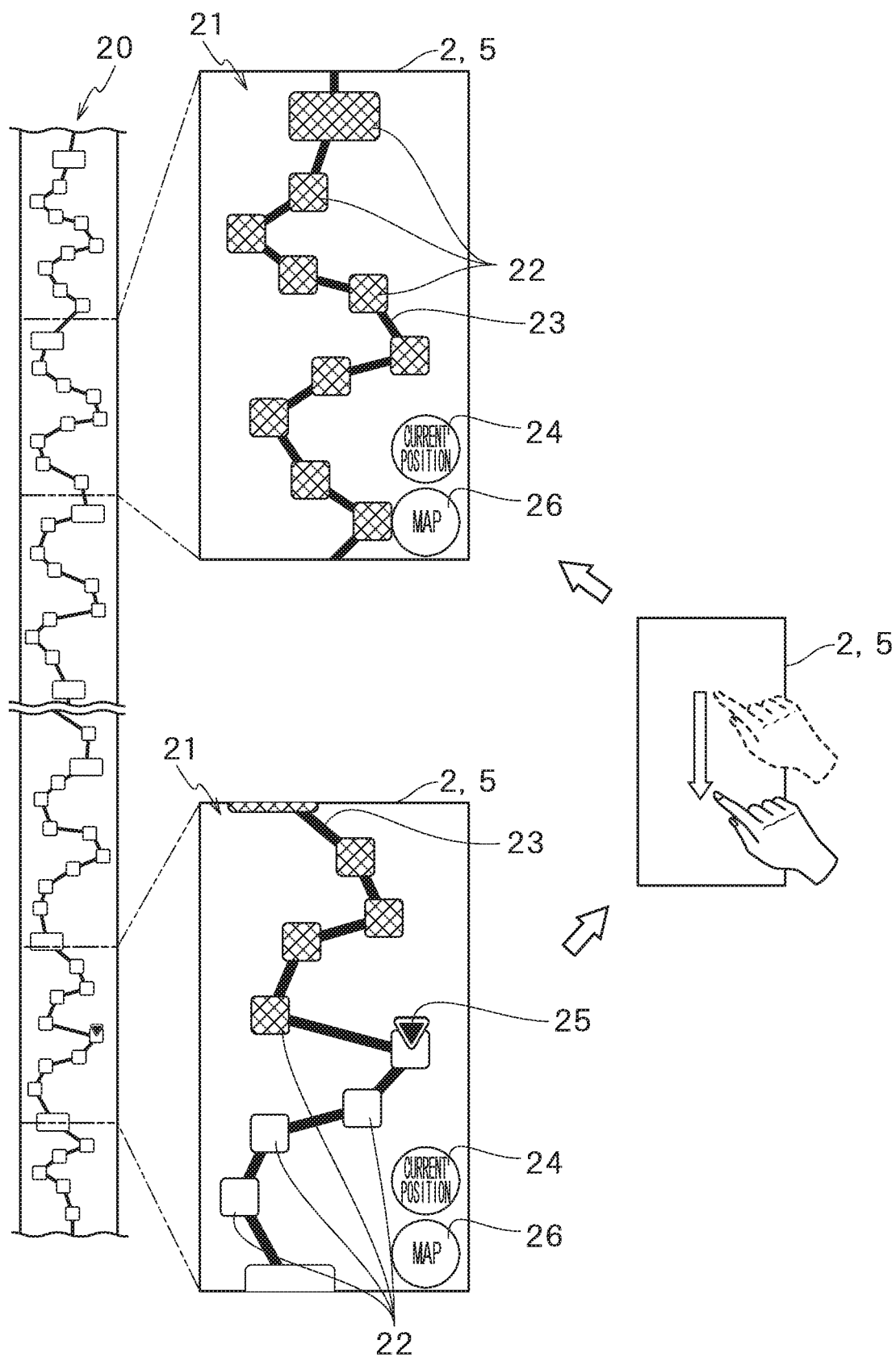
FIG. 5 is a diagram representing an example of a display screen of the information processor.

As shown in FIG. 5, in the map screen, the displaying area 21 in the map 20 can be changed. In more detail, it is scroll-displayed through the swipe operation of the user, and the position of the displaying area 21 in the map 20 is set to a different place. For example, when a user performs a swipe operation from top to bottom on the map screen, the map screen is scroll-displayed in such a way that the map 20 located above opposite to the swipe direction is set in the displaying area 21. In this way, even when the map screen is scroll-displayed, the setting of the current position can be maintained, that is, the node icon 22 which is set to be the current position can be maintained. In this way, when it is determined that the operation received by the touch panel 5 in the displaying area 21 is an operation denoting the indication of the scroll and the scroll direction, the displaying range in the map screen indicated by the displaying area 21 is changed.

Figure 6:
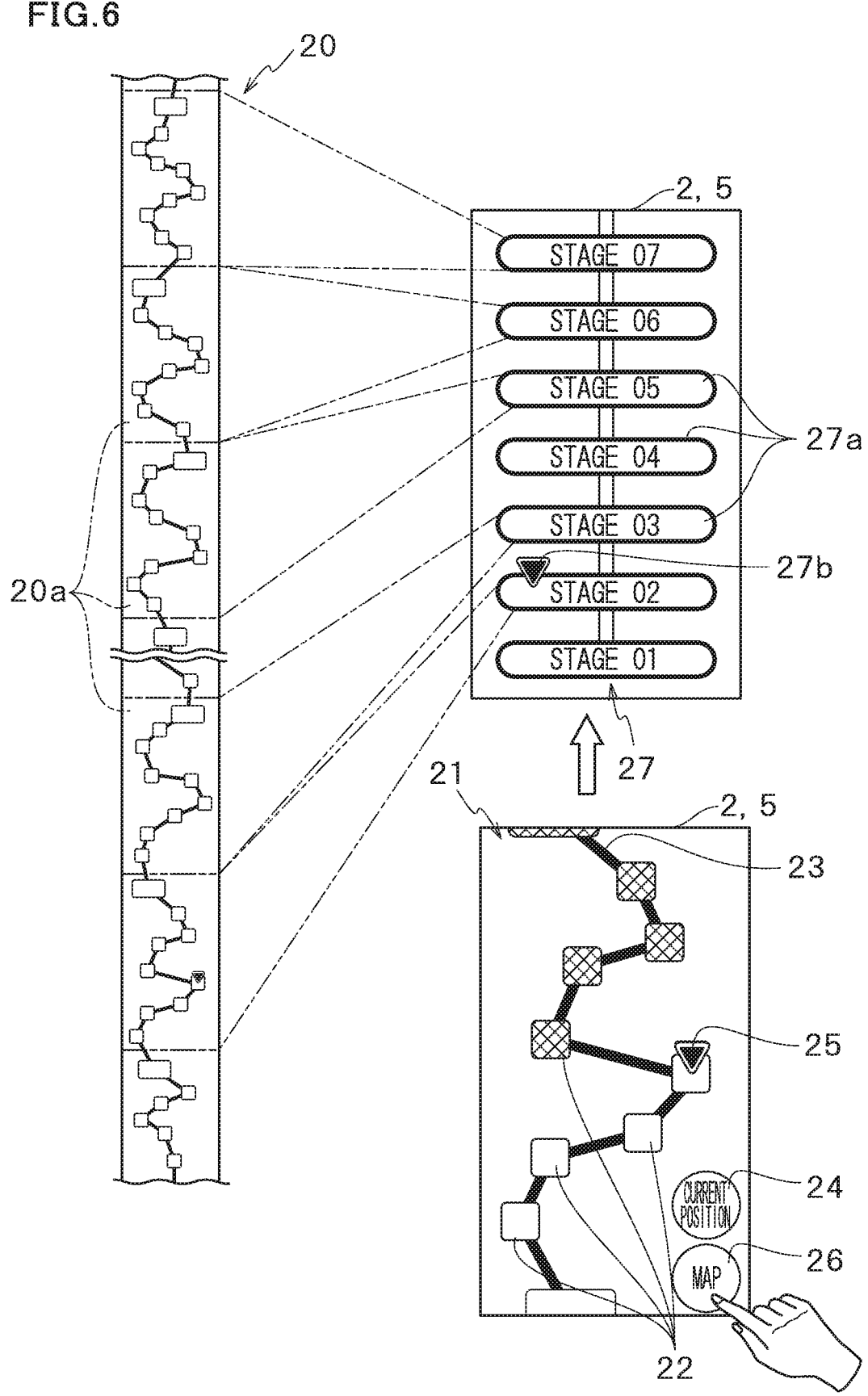
FIG. 6 is a diagram representing an example of a display screen of the information processor.

In addition, as shown in FIG. 6, in the present embodiment, the displaying area 21 can be changed from a stage selection screen. In more detail, as shown in FIG. 6, the screen transitions from the map screen to the stage selection screen 27 in the display 2 through performing a touch input to the map icon 26 displayed in the map screen.

The stage selection screen 27 displays a plurality of stage icons 27a juxtaposed from the lower end to the upper end. Each stage icon 27a corresponds to a plurality of regions defined by the map 20 in the up-down direction, that is, the stage map 20a, respectively. That is, the stage map 20a is continuously arranged in the up-down direction, and constitutes the map 20 as a whole. The stage icon 27a is provided with a order of progress in the order from lower end to upper end. The order of progress of the stage icon 27a corresponds to the arrangement order of the stage map 20a arranged continuously from the lower end to the upper end in the map 20. In addition, the current position stage icon 27b denoting this is displayed in the stage icon 27a corresponding to the stage map 20a in which the node icon 22 which is set to be the current position exists.

In the stage selection screen 27, when a touch input is performed with respect to a certain stage icon 27a, a map screen is displayed which takes the stage map 20a corresponding to the stage icon 27a to be an object of the touch input as the displaying area 21. In this way, it is possible to configure such that the setting of the current position can be maintained not to change through the stage selection screen 27, and the displaying area can be changed.

(Information Processor 1: Display screen: Move to the Current Position)

Figure 7:
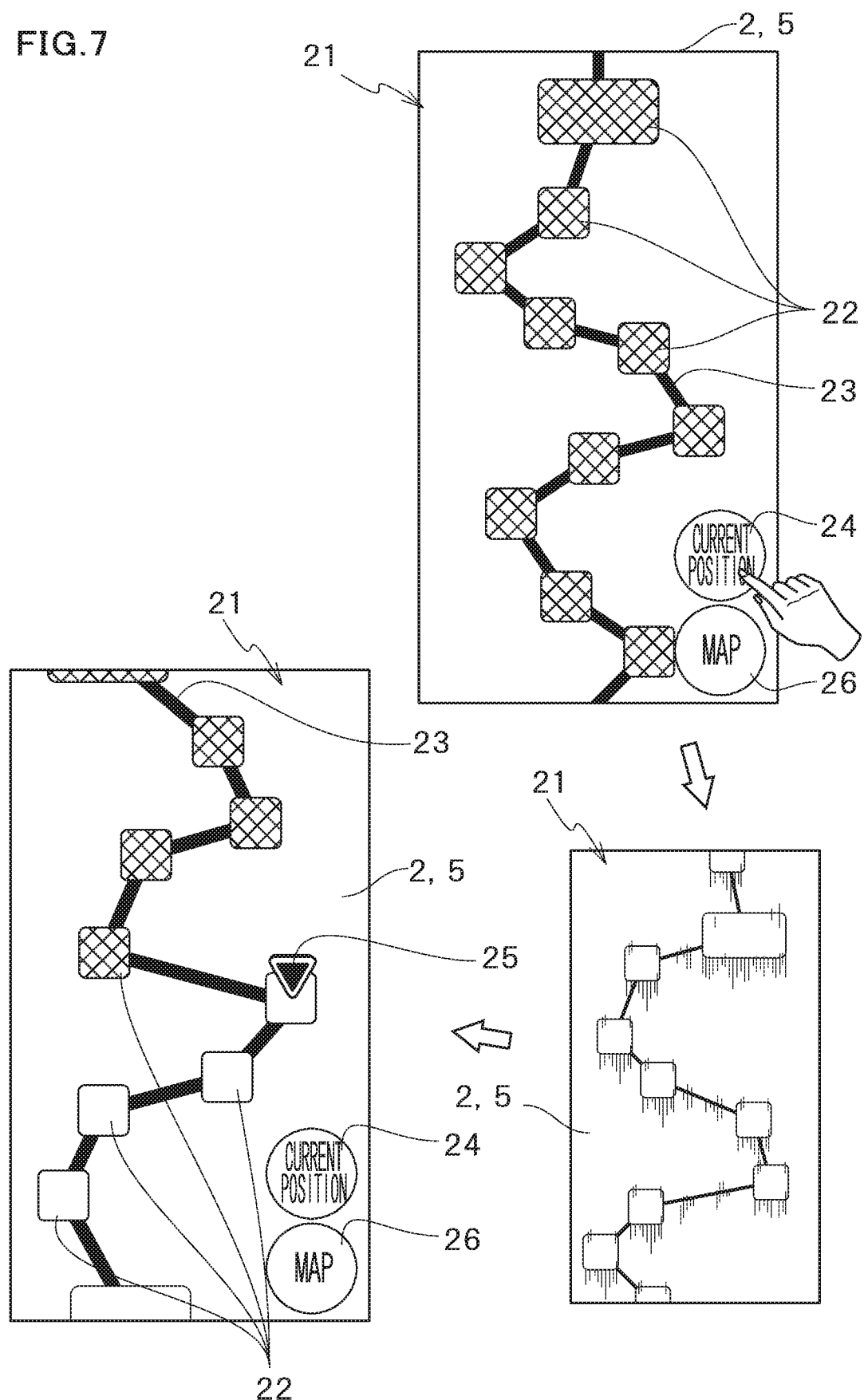
FIG. 7 is a diagram representing an example of a display screen of the information processor.

Referring to FIG. 7, a description will be given of the movement to the current position using the current position indicating icon 24. As shown in FIG. 7, when swipe-based scroll displaying is performed and/or the displaying area 21 in which there is no node icon 22 which is set to be the current position is displayed through the stage selection screen 27, if the current position indicating icon 24 is touch input, the scroll displaying is performed. The scroll direction is a direction of the distribution of the stage map 20a in the map 20. That is, in the map 20, the scroll displaying is performed is such a way that the displaying area 21 is sequentially changed from the area of the current displaying area 21 toward the area where the node icon 22 which is set to be the current position is located.

In this way, in a case of returning the current position using the current position indicating icon 24, the scroll displaying is performed until the displaying area of the current position, and thus it is able to cause the user to recognize how far the current position is away. Therefore, when the user wants to access a position before returning the current position again, the user is able to take the direction, the time and the like of the scroll displaying as an indication to understand the position before returning. As a result, it is able to further improve the user interface in the information processor 1 which comprises the touch panel 5.

In addition, it is not limited thereto, and the scroll displaying may not be performed, but the displaying area 21 in which the node icon 22 which is set to be the current position is located is displayed in the display 2 in such a way that the screen transitions.

Besides, as shown in FIG. 7, the scroll displaying is stopped in a state in which a certain area where the node icon 22 which is set to be the current position is set as the displaying area 21. At this time, the position of the displaying area 21 is set in such a way that the node icon 22 which is set to be the current position is arranged at the center position in the up-down direction of the displaying area 21. In this way, in a case of using the current position indicating icon 24, the displaying area 21 is set in such a way that the current position is located at a center position. Therefore, in a case of displaying the displaying area 21 in which the current position is located by using the current position indicating icon 24, it is able to easily find the current position in the displaying area 21.

In addition, in the displaying area 21 which is displayed by using the current position indicating icon 24, the node icon 22 which is set to be the current position is not limited to be arranged at the center position in the up-down direction. For example, the displaying area 21 displayed by using the current position indicating icon 24 may also serve as an area corresponding to the stage map 20a in the map 20. That is, in the stage selection screen 27, it is also possible to select the stage icon 27a indicating the current position stage icon 27b and to display the same display area 21 as when the map screen is displayed.

In this way, even when the map screen of the displaying area 21 which is farther from the node icon 22 which is set to be the current position is displayed by the scroll or the like, the area of the map 20 in which the node icon 22 which is set to be the current position is located is set to be the displaying area 21. That is, the user can perform a touch input to the current position indicating icon 24 so that the node icon 22 which is set to be the current position can be displayed in the map screen.

In addition, as shown in FIG. 8, when the current position indicating icon 24 is touch input, and in a case of the node icon 22 which is set to be the current position existing within the range of the set displaying area 21, it is preferable to cancel the scroll displaying based on the operation. That is, when the current position indicating icon 24 is touch input, and in a case of the displaying area 21 in which the current position is located being already displayed, even if the node icon 22 which is set to be the current position is not located at the center position in the up-down direction in the displaying area 21, the scroll displaying is not performed. Therefore, it is able to inform that the displaying area 21 in which the current position is located has been displayed clearly.

In addition, as shown in FIG. 8, in a case as the above, when the scroll displaying is canceled, it is preferable to highlight the node icon 22 which is set to be the current position. In this way, in a case of returning the current position using the current position indicating icon 24 by the user, when the displaying area 21 in which the current position is located has been displayed, the scroll displaying is not performed but the node icon 22 of the current position is highlighted. Therefore, it is able to inform of the location of the current position in the displaying area 21 which has been displayed clearly.

In addition, "highlighting of the node icon" is not limited to the highlighting of the node icon itself, and for example, the current position icon 25 represented by the node icon which is set to be the current position may also be highlighted.

(Information Processor 1: Displaying Screen: the Selection of the Current Position)

Figure 9:
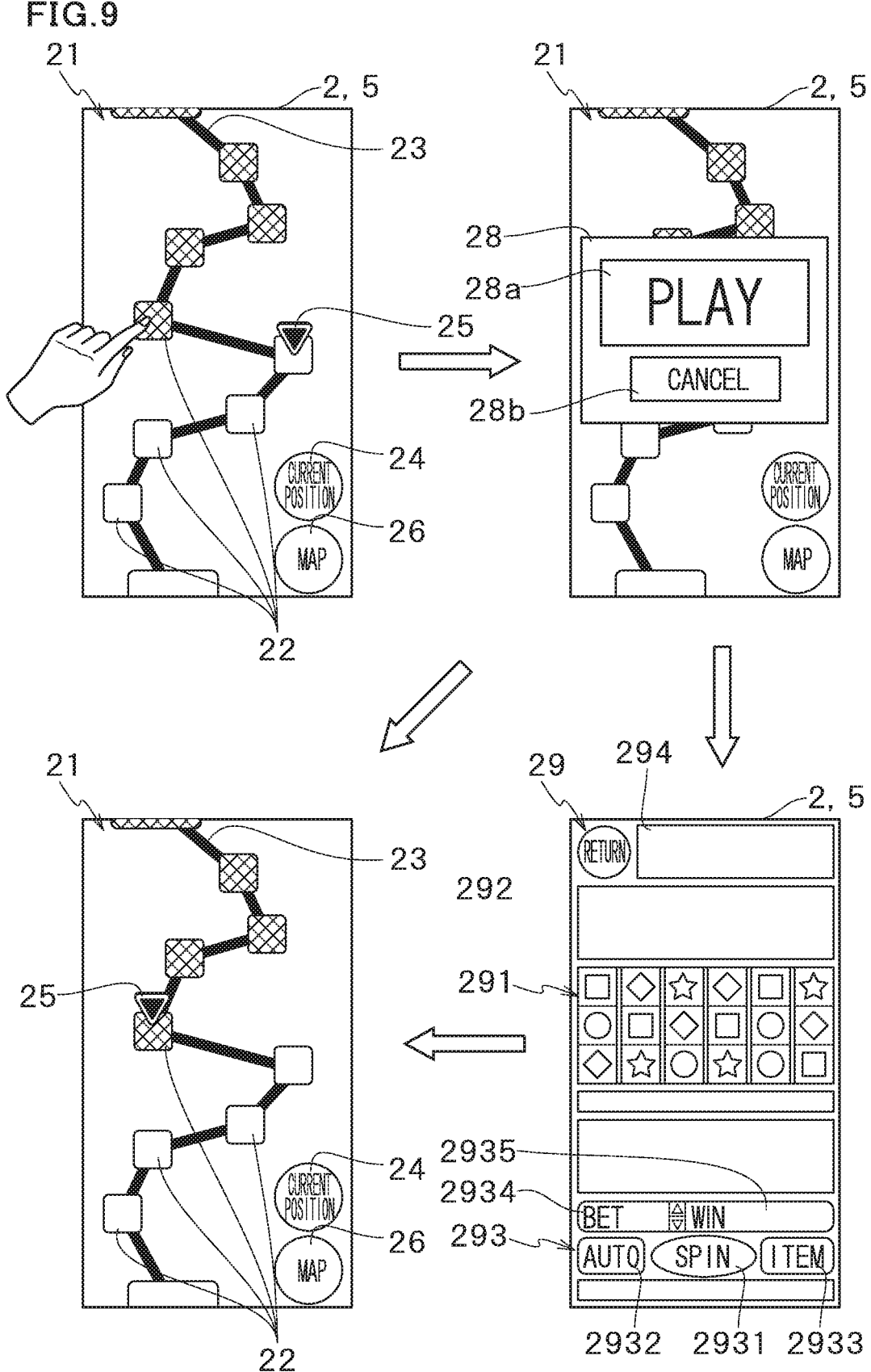
FIG. 9 is a diagram representing an example of a display screen of the information processor.

As shown in FIG. 9, in the map screen, when the node icon 22 is selected, a slot game that is a game element can be performed. More specifically, in the displaying area 21, when a certain node icon 22 is touch input, a play confirmation window 28 which is used to confirm whether or not to execute a slot game associated with the node icon 22 is displayed. In the play confirmation window 28, a play button 28a and a cancellation button 28b are provided.

In the present embodiment, in the stage where a touch input as the above is performed to the node icon 22, the node icon 22 is set to be the current position. For example, in the play confirmation window 28, the selected node icon 22 is set to be the current position even though the cancellation button 28b is touch input. That is, in the stage where the play confirmation window 28 is displayed, the node icon 22 has been set to be the current position.

In addition, in the play confirmation window 28, when the play button 28a is touch input, in the display 2, the screen transitions to the slot game screen 29, and a slot game that is a game element can be executed.

In addition, the setting timing regarding the current position is not limited thereto. For example, it is also possible to select the node icon 22, and the user playing a game element related to the node icon 22 is regarded as a condition, and the node icon 22 is set to be the current position.

As shown in FIG. 9, the information processor 1 is configured such that a slot game screen is displayed in the display 2, and a slot game that is a game element can be executed. The slot game screen includes a game area 291 where symbol display areas 21a are displayed to form plural rows and columns, an effect area 292 where moving images and still images such as game characters are displayed in accordance with the slot game, an operation area 293 which is operated by the player to progress the game, and a game information display area 294 which displays game contents and game information. The operation area 293 includes a spin button 2931, an AUTO button 2932, an ITEM button 2933, a bet button 2934, and a WIN display portion 2935, which are images.

As described above, on the entire surface of the display 2, a touch panel 5 which allows the game screen to be viewable from the outside is provided. The touch panel 5 makes it possible to detect the coordinates of a part touched by a player's finger or the like. With this arrangement, for example, the slot game (unit game) is executed once, as the image of the spin button 2931 is touch inputted. Furthermore, the slot game is serially executed plural times as the image of the AUTO button 2932 is pressed. An example of a slot game executed as a game element will be described below.

(Information Processor 1: Specific Example: Slot Game: Definitions)

The base game in the slot game of the present embodiment is a game in which plural symbols are displayed (arranged) by being varied and stopped in the game area 291, and includes a normal game. A state in which a symbol is displayed after being varied and stopped in the game area 291 is termed rearrangement? As a bonus game, the free game is executed at least once in the slot game. The slot game may include a process of executing a free game where symbols are rearranged on condition that the payout rate is higher than the payout rate in the normal game and a bonus payout is awarded in accordance with the rearranged symbols.

A gaming value which is awarded when a prize is established as a result of a game result is a coin, paper money, or electrically valuable information corresponding to these. Note that the gaming value in the present invention is not particularly limited. Examples of the gaming value include game media such as medals, tokens, cyber money, tickets, and the like. A ticket is not particularly limited, and a barcoded ticket may be adopted for example. Alternatively, the gaming value may be a game point not including valuable information.

The free game is a game which is executable with a smaller amount of gaming values bet than in the normal game. Note that "bet of smaller amounts of gaming values" encompasses a bet of zero gaming value. The "free game" therefore may be a game runnable without a bet of a gaming value, which free game awards an amount of gaming values based on symbols rearranged. In other words, the "free game" may be a game which starts without consumption of a gaming value. To the contrary, the "normal game" is a game runnable on condition that a gaming value is bet, which normal game awards an amount of gaming value based on the symbols rearranged. In other words, the "normal game" is a game which starts with consumption of a gaming value.

The "unit game" is a series of operations from the start of the receiving of a bet to a state in which an award can be established. To put it differently, the unit game includes a single bet time for receiving a bet, a single game time of rearranging stopped symbols, and a single payout time of a payout process of awarding a payout.

A state in which a symbol is displayed after being varied and stopped in the game area 291 is termed rearrangement? To put it differently, the term "rearrangement" indicates that the symbols are rearranged after the arrangement of the symbols is dismissed. The term "arrangement" indicates a state in which the symbols are visually recognizable by an external player.

(Information Processor 1: Specific Example: Functional Blocks)

Figure 10:
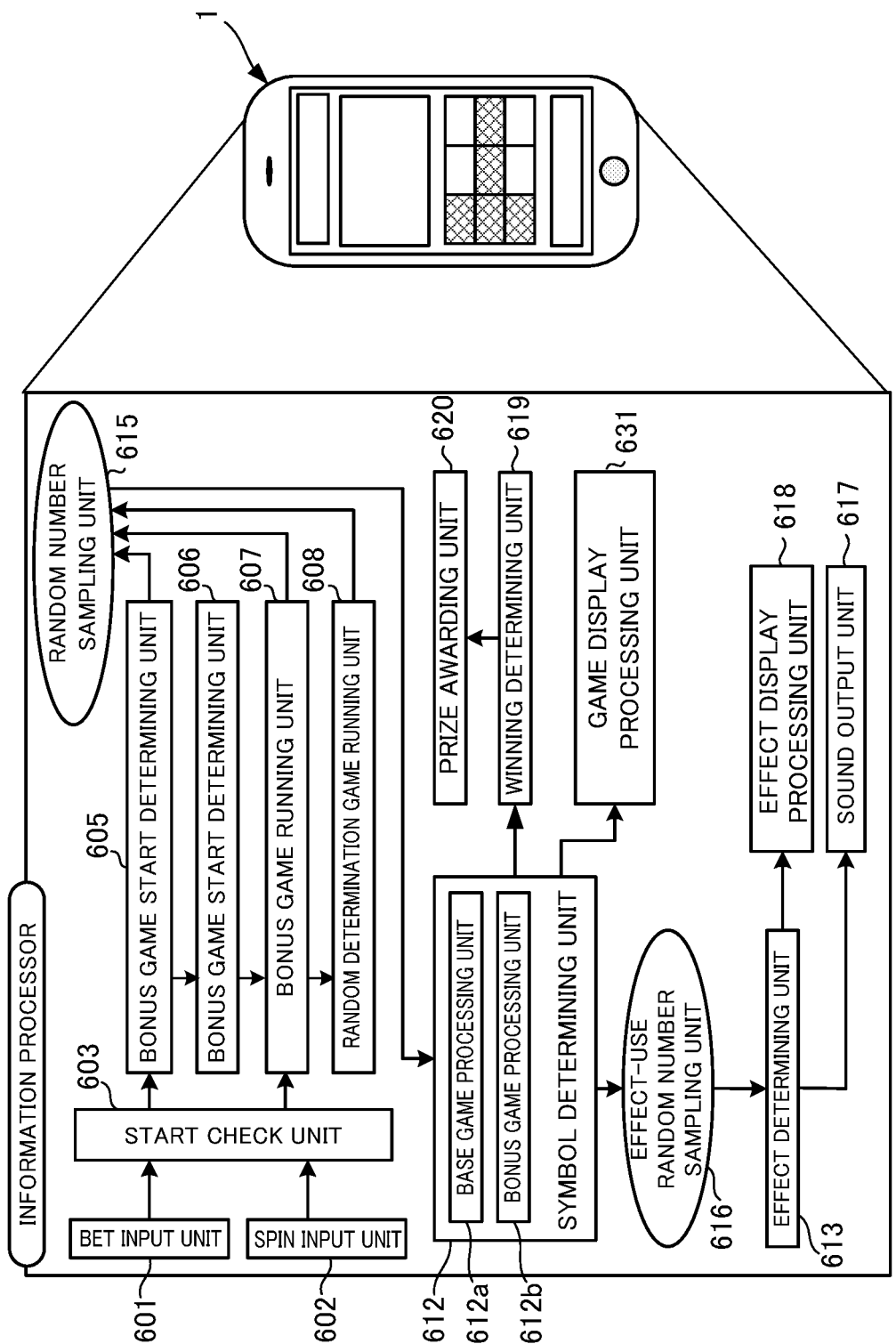
FIG. 10 is a functional block diagram of the information processor.

As shown in FIG. 10, the information processor 1 which is the gaming machine running the slot game has the following functions. To be more specific, the information processor 1 includes a BET input unit 601 and a spin input unit 602. The BET input unit 601 and the spin input unit 602 are input devices. The BET input unit 601 has a function of receiving a bet in response to a user's operation. The spin input unit 602 has a function of receiving a user's operation, i.e., an instruction to start a game.

The information processor 1 includes a start check unit 603, a normal game running unit 605, a bonus game start determining unit 606, a bonus game running unit 607, a random determination game running unit 608, a random number sampling unit 615, a symbol determining unit 612, an effect-use random number sampling unit 616, an effect determining unit 613, a sound output unit 617, an effect display processor 618, a winning determining unit 619, a prize awarding unit 620, a random determination game determination processor 630, and a game display processor 631.

The normal game running unit 605 has a function of running a normal game which is a base game, on condition that the BET input unit 601 is operated. The bonus game start determining unit 606 determines whether to run a bonus game, based on a combination of the symbols rearranged in the normal game. In other words, the bonus game start determining unit 606 has functions of: determining that the player is entitled to a bonus game when a bonus symbol is rearranged; and activating the bonus game running unit 607 so as to run a bonus game from the subsequent unit game. The random determination game running unit 608 has a function of randomly determining prizes including the bonus game. As this function is executed after the execution by the bonus game running unit 607, the bonus game can be repeatedly run.

The symbol determining unit 612 includes a base game processor 612a and a bonus game processor 612b. The symbol determining unit 612 including these processors 612a and 612b has functions of: determining symbols to be rearranged based on a random number given from the random number sampling unit 615; rearranging the determined symbols in the game area 291 of the display 2; outputting rearrangement information of the symbols to the winning determining unit 619; and outputting an effect instruction signal to the effect-use random number sampling unit 616, based on the combination of the rearranged symbols.

The effect-use random number sampling unit 616 has a function of sampling an effect random number when receiving an effect instruction signal from the symbol determining unit 612 and a function of outputting the effect random number to the effect determining unit 613. The effect determining unit 613 has functions of: determining an effect content by using the effect-use random number; outputting image information on the determined effect content to the effect display processor 618; and outputting audio and illumination information of the determined effect content to the sound output unit 617.

The winning determining unit 619 has functions of: determining whether a winning is achieved based on a combination of symbols when information rearrangement information of the symbols is given; calculating an amount of payout based on a winning combination formed when it is determined that a winning has been achieved; and outputting, to the prize awarding unit 620, a payout signal which is based on the payout amount. The prize awarding unit 620 has a function of payout out a gaming value to the user.

(Information processor 1: An Example of the Slot Game: Game Content)

The information processor 1 has three game modes as the slot game, namely the base game mode, the bonus game mode, and the random determination game mode. The information processor 1 shifts to the bonus game mode when the unit game is run in the base game mode and a bonus trigger condition is satisfied in the base game mode. The trigger of the bonus game is, for example, a condition in which three or more bonus symbols consecutively appear (are rearranged) from the first reel. The trigger of the bonus game may be another condition.

(Information Processor 1: Specific Example: Slot Game Game Content: Base Game Mode)

The base game mode is specifically described. In the game area 291 displayed on the display 2 shown in FIG. 9, symbols for the slot game are rearrangeable on the video reels with three rows and six columns. In a betting process (B1), a bet amount is selected by the user. The bet amount is, for example, selected from numbers such as 1, 2, 3, 5, and 10 by operating the bet button 2934, and a desired number may be also input. The resource generated by accumulating parts of bet amounts is termed jackpot.

Next, in the game area 291, thereafter, as the symbols are rearranged by varying (scroll-moving) and stopping (scroll-stop) the video reels, win determination is performed based on the state of the rearranged symbols (B3). For example, the bonus game trigger is established when the bonus symbols are consecutively rearranged from the first column area (first reel) to the six column area (sixth reel). The bonus game trigger is also established when the bonus symbols and a wild symbol which is able to substitute for the bonus symbol are consecutively rearranged.

(Information Processor 1: Specific Example: Slot Game Game Content: Bonus Game Mode)

The base game mode shifts to the bonus game mode when the trigger condition of the bonus game is established, and a free game process is executed.

In the free game process, free game reel strips used in the free game are determined, and a predetermined number of times of execution of the free game is set. The reel strips for the free game and the number of times of execution of the free game may be randomly chosen from plural selected options such as reel strips.

As the free game is run, win determination is executed (F92). This win determination may be identical with the win determination in the base game (B3). For example, when three or more bonus symbols consecutively appear from the first reel, the retrigger condition of the bonus game (free game) is established.

Then, it is determined whether a free game ends or not, and if the free game does not end, the free game continues, and the remaining free games are performed.

(Information Processor 1: Action) Next, a game program processed by the map screen executed by the CPU 101 of the information processor 1 will be described with reference to FIG. 11.

(Information Processor 1: Action: Map Screen Process)

Figure 11:
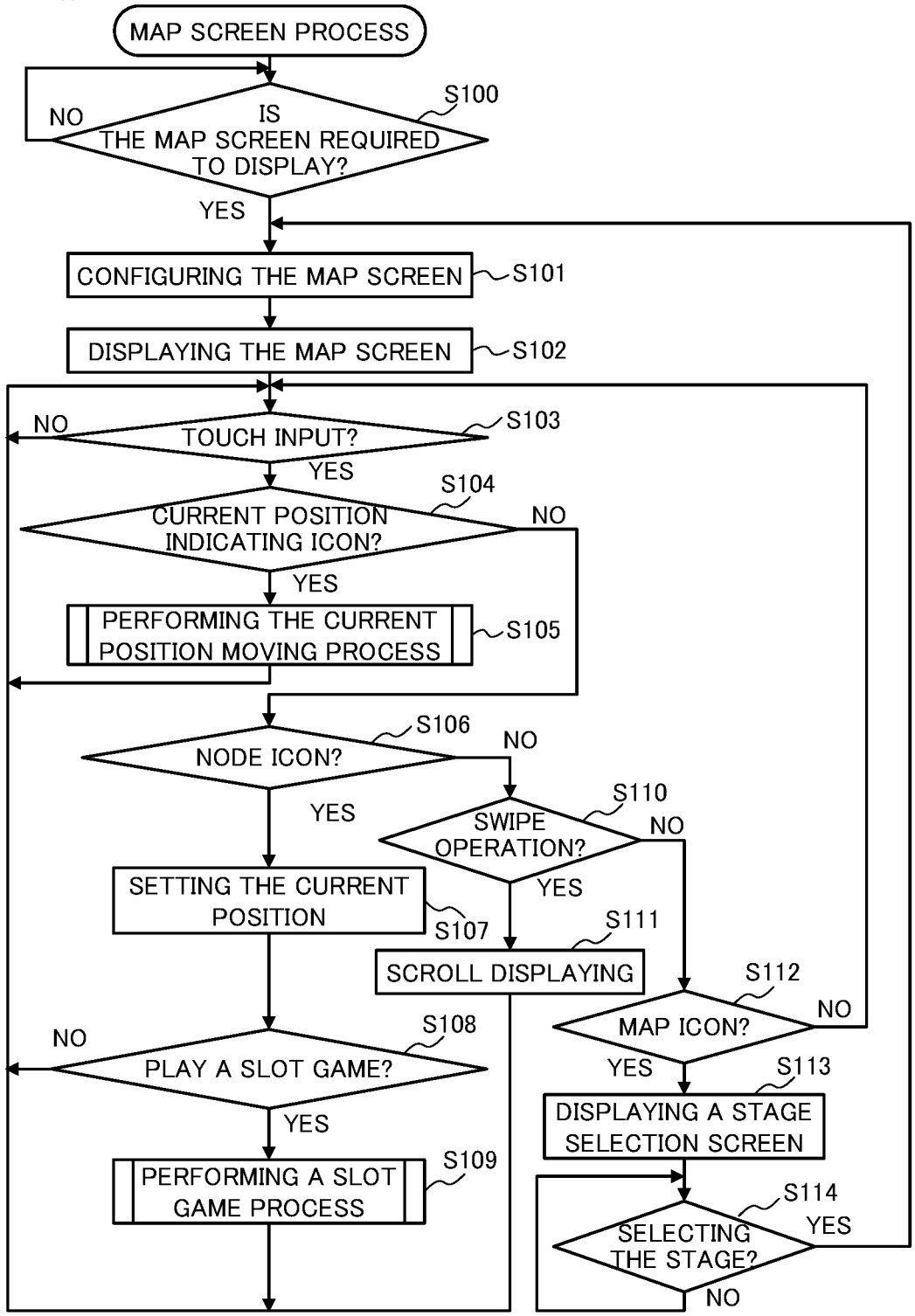
FIG. 11 is a flow chart of a process of a map screen.

As shown in FIG. 11, first, the CPU 101 determines whether the map screen is required to be displayed or not (S100). For example, in another screen in which a button for transition to the map screen is disposed, the request occurs by the button being touch input. When there is no displaying request for the map screen (S100: NO), the CPU 101 repeats step S100 and waits for the request.

When there is a displaying request for the map screen (S100: YES), the CPU 101 performs the configuration of the map screen (S101). More specifically, the CPU 101 gets the information necessary for the map screen stored in a server and/or the information processor 1 itself regarding the progress of a game or the like and configure the displayed data. Then, the CPU 101 displays the map screen containing the current position indicating icon 24 and the map icon 26 based on the configured information (S102).

After displaying the map screen, the CPU 101 determines whether there is a touch input or not (S103). When there is no touch input (S103: NO), the CPU 101 repeats the step S103 and waits for the touch input from the user.

If there is a touch input (S103: YES), the CPU 101 determines whether the object of the touch input is the current position indicating icon 24 or not(S104). When the object of the touch input is the current position indicating icon 24(S104: YES), the CPU 101 executes the current position moving process (S105) and transitions the process to the step S103. In addition, the current position moving process will be described later.

On the other hand, when the object of the touch input is not the current position indicating icon 24(S104: NO), the CPU 101 determines whether the object of the touch input is a certain node icon 22 or not(S106). When the object of the touch input is a certain node icon 22 (S106: YES), the CPU 101 sets the node icon 22 that is the object of the touch input to be the current position (S107). That is, the CPU 101 stores the case where the node icon 22 is the current position in the RAM 103.

Further, the CPU 101 determines whether the user has played a slot game or not (S108). When the user plays a slot game, the CPU 101 executes a slot game process (S109) and transitions the process to the step S103. The slot game process will be described later.

When it is determined in the step S106 that the object of the touch input is not any node icon 22 (S106: NO), the CPU 101 determines whether the touch input is a swipe operation or not (S110). When the touch input is a swipe operation, the CPU 101 performs a scroll displaying in the map screen based on the swipe operation (S111), and transitions the process to the step S106.

On the other hand, when the touch input is not a swipe operation (S111: NO), the CPU 101 determines whether the object of the touch input is a map icon 26 or not (S112). When the object of the touch input is not the map icon 26 (S112: NO), the CPU 101 transitions the process to the step S103.

When the object of the touch input is the map icon 26 (S112: YES), the CPU 101 displays the stage selection screen (S113). Further, the CPU 101 determines whether or not a certain stage icon 27a is selected in the stage selection screen (S114). When none of the stage icons 27a is selected (S114: NO), the step S114 is repeated and the selection based on the stage performed by the user is caused to stand by. When a certain stage icon 27a is selected (S114: YES), the CPU 101 transitions the process to the step S101. Then, in the step S101, the CPU 101 configures the stage map 20a corresponding to the stage icon 27a as a map screen that is the displaying area 21.

(Information processor 1: Action: the Current Position Moving Process)

Next, with reference to FIG. 12, a subroutine, i.e. a game program of the current position moving process, of the map screen process executed by the CPU 101 of the information processor 1 will be described.

Figure 12:
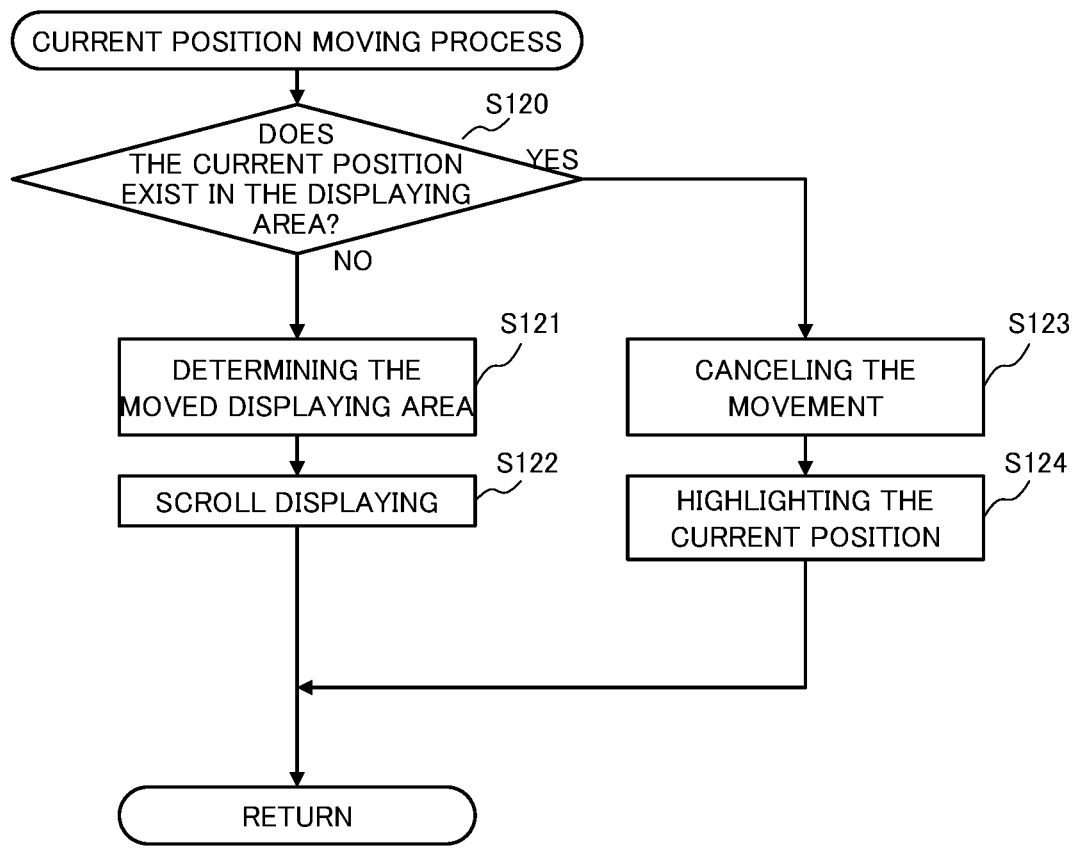
FIG. 12 is a flow chart of a process of a current position moving.

As shown in FIG. 12, first, the CPU 101 determines whether or not there is a node icon 22 which is set to be the current position in the displaying area 21 currently displayed in the display 2 (S120). When there is no node icon 22 in the displaying area 21 (S120: NO), the CPU 101 determines the displaying area 21 in which the moved current position is displayed (S121). At this time, the CPU 101 sets the displaying area 21 in such a way that the node icon 22 which is set to be the current position is located at the center position in the up-down direction (scroll direction). Further, the CPU 101 performs a scroll displaying from the current displaying area 21 to the set displaying area 21 (S122). Then, the CPU 101 ends this routine and returns the process to the map screen process.

On the other hand, in the step S120, when the node icon 22 is present in the displaying area 21 (S120: YES), the movement is canceled (S123) and the node icon 22 which is set to be the current position is highlighted (S124). Then, the CPU 101 ends this routine and returns the process to the map screen process.

(Information Processor 1: Action: Slot Game Process)

Next, with reference to FIG. 13, a subroutine, i.e. a game program of the slot game process, of the map screen process executed by the CPU 101 of the information processor 1 will be described.

Figure 13:
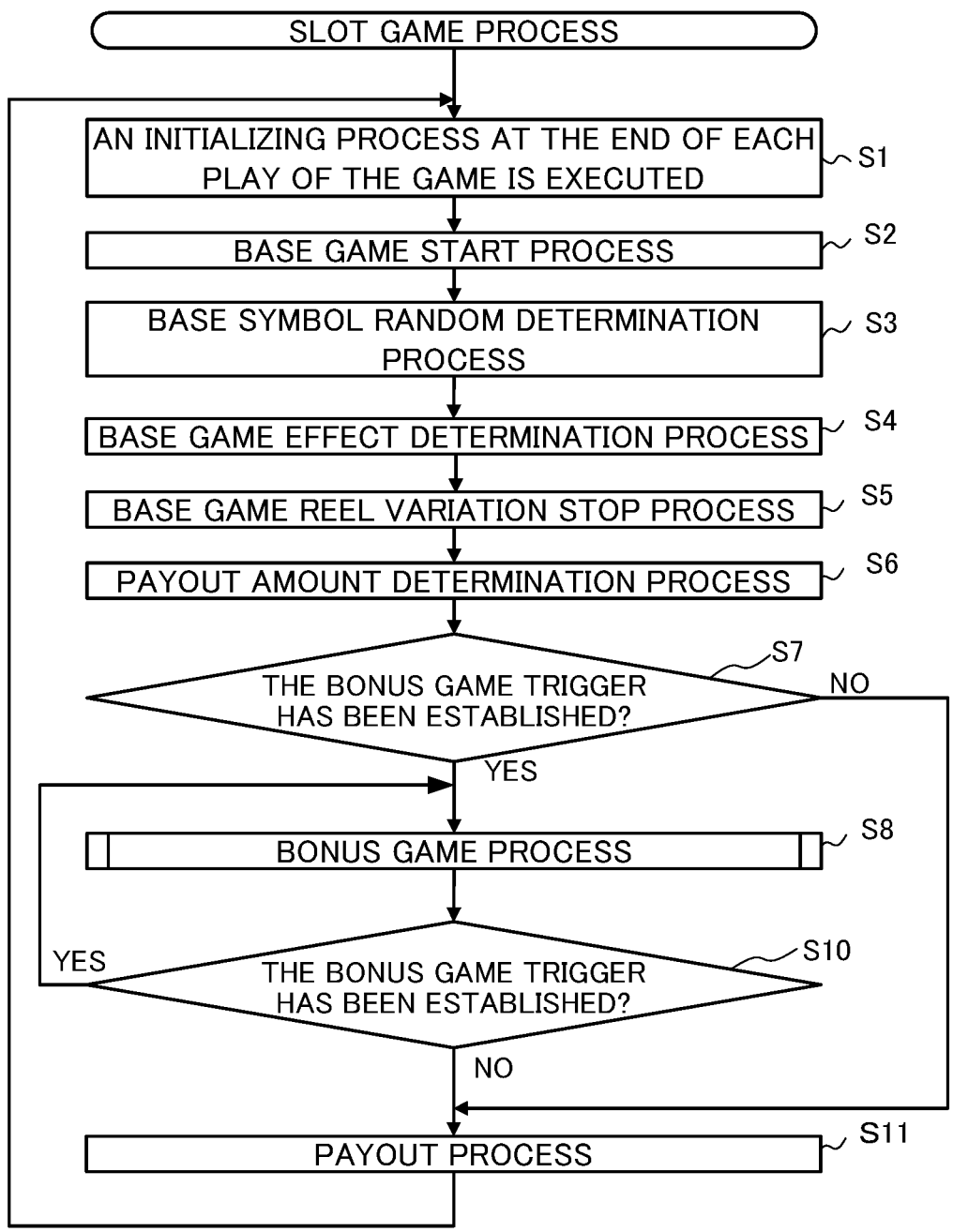
FIG. 13 is a flow chart of a process of a slot game.

As shown in FIG. 13, an initializing process at the end of each play of the game is executed (S1). For example, this process clears data in a working area of the RAM 103, which becomes unnecessary at the end of each play of game, e.g., the bet amount and symbols selected by random determination. After a base game start process (S2), a base symbol random determination process is executed (S3). In this process, to-be-stopped symbols are randomly selected and determined based on a random number by using a random determination table.

Then a base game effect determination process is executed (S4). The CPU 101 samples an effect-use random number and randomly determines any of a plurality of predetermined effect contents, and executes the determined effect content at the determined timing. For example, an effect image is displayed in an effect area 292 of the display 2, and sound is output by the speaker 115.

Then a base game reel variation stop process is executed (S5). In this process, the scroll of the symbol columns in the symbol display area 21a starts, and the to-be-stopped symbols determined in the base game symbol random determination process are stopped at predetermined positions.

Then a payout amount determination process is executed (S6). In the base game, a payout amount is determined in accordance with a combination of symbols and based on a payout table, and the determined payout amount is stored in a payout amount storage area of the RAM 103. When the bonus game trigger is established, a payout amount is determined in accordance with a combination of bonus symbols, based on a rule different from the rule in the base game.

Then whether the bonus game trigger has been established is determined (S7). When the bonus game trigger has been established (YES in S7), a bonus game process is executed (S8). When the bonus game trigger has been established (YES in S10), the bonus game process in S8 is executed again.

In the meanwhile, if the bonus game trigger has not been established in S7 or S10 (NO in S7 or S10), a payout process is executed (S11). The CPU 101 adds a value stored in the payout amount storage area to a value stored in a credit amount storage area (credit counter) provided in the RAM 103. Then the steps are executed again from S1.

(Information Processor 1: Specific Example: Game Content: Bonus Game Process)

Figure 14:
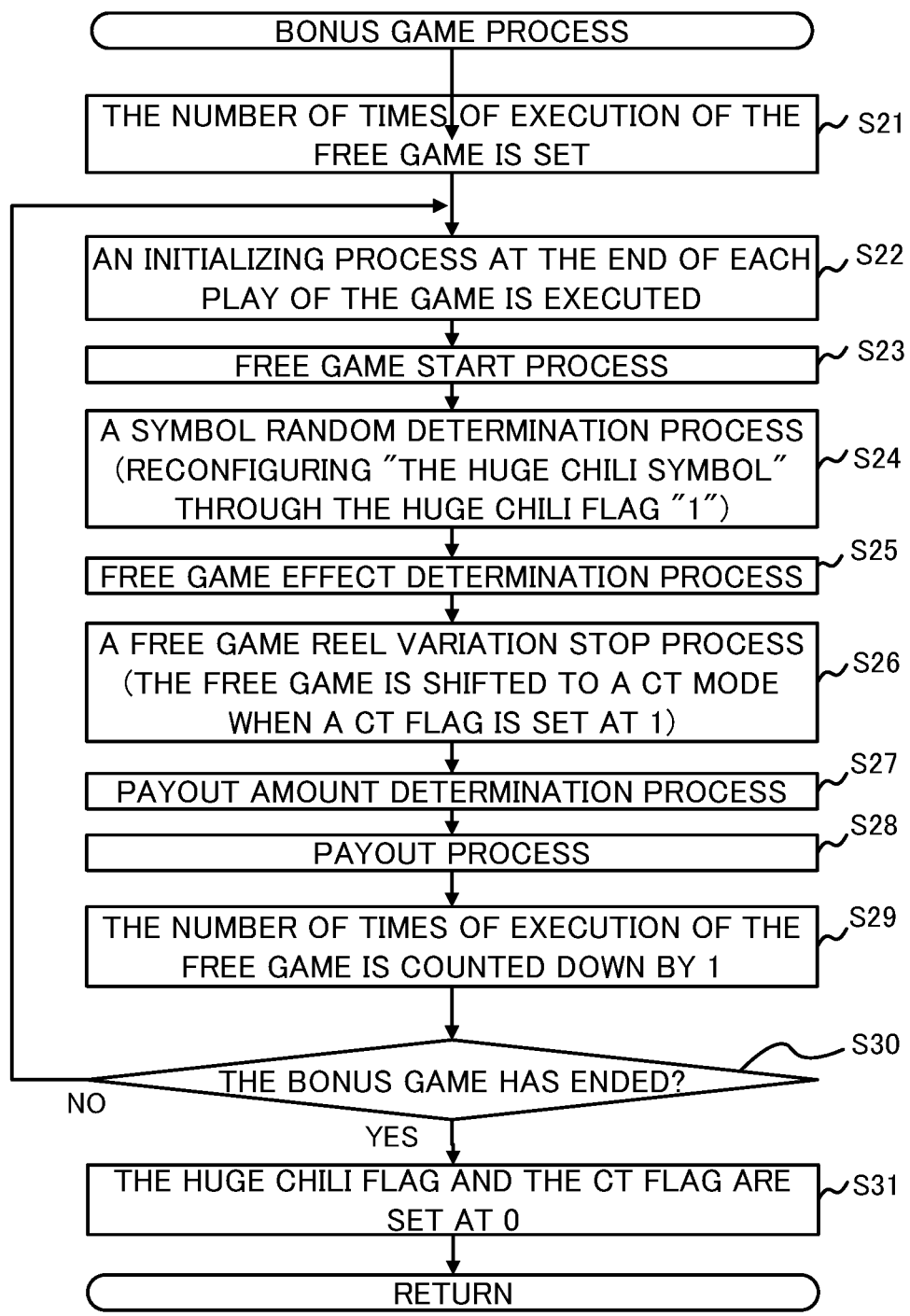
FIG. 14 is a flow chart of a process of a bonus game.

Next, with reference to FIG. 14, a subroutine, i.e. a game program of the bonus game process, of the slot game process executed by the CPU 101 of the information processor 1 will be described.

To begin with, the number of times of execution of the free game is set (S21). For example, the number of times of execution of the free game is set at 5. Then an initializing process at the end of each play of the game is executed (S22). For example, this process clears data in a working area of the RAM 103, which becomes unnecessary at the end of each play of game, e.g., the symbols selected by random determination. It is noted that the bet amount in the bonus game is identical with the bet amount in the base game immediately before the shift to the bonus game.

Thereafter, in the same manner as in the base game, a free game start process (S23), a symbol random determination process (S24), and a free game effect determination process (S25) are executed. In the free game, a free game symbol random determination table different from the symbol random determination table in the base game is used. In the free game symbol random determination process, when a Huge Chili flag is set at 1, random determination is executed such that a Huge Chili symbol is to be rearranged.

Thereafter, a free game reel variation stop process (S26) is executed to vary and stop the reels. In this process, the free game is shifted to a CT mode when a CT flag is set at 1. In this mode, the user is allowed to forcibly stop the reels by an operation. Thereafter, a payout amount determination process (S27) and a payout process (S28) are serially executed, and then the number of times of execution of the free game is counted down by 1 (S29). Then whether the bonus game has ended is determined (S30). When the number of times of execution of the free game is not 0 (NO in S30), the steps are executed again from S22 as it is determined that the bonus game has not ended. In the meanwhile, when the number of times of execution of the free game is 0 (YES in S30), it is determined that the bonus game has ended. Then the Huge Chili flag and the CT flag are set at 0 (S31). As such, the flags are maintained at 0 in the bonus game after the base game, and the flags are changed from 1 to 0 in the bonus game after the random determination game. The process is then terminated and the processing routine shown in FIG. 13 is resumed.

SUMMARY OF THE INVENTION

The information processor 1 comprises a display 2 for displaying a screen, a touch panel 5 provided on the entire surface of the display 2 and receiving a touch input of a user, and a controller 4 such as a CPU 101, and the controller 4 is programmed in such a way that the following processes are executed: a process of displaying the displaying area 21 set according to the screen in the display 2, in the map 20 having a plurality of node icons 22 on the path; a process of displaying the current position indicating icon 24 in the display 2; and for the operation received by the touch panel 5, when it is determined to be an operation denoting one of the plurality of node icons 22, a process of setting the one of the plurality of node icons 22 to be the current position based on this node icon 22; and for the operation received by the touch panel 5, when it is determined to be an operation denoting the current position indicating icon 24, a process of displaying the displaying area 21 in which the node icon 22 which is set to be the current position is located in the map 20 is displayed.

According to the structure mentioned above, in the map 20, even in a case of that the displaying area 21 is farther from the node icon 22 which is set to be the current position, the displaying area 21 for which the node icon 22 is set to be the current position is displayed through performing an operation denoting the current position indicating icon 24. Therefore, there is no need to search for the node icon 22 which is set to be the current position, and it is easy to display the node icon 22 which is set to be the current position.

As a result, it is able to improve the user interface in the information processor which comprises the touch panel 5.

In the information processor 1, the controller 4 performs a scroll displaying until the set displaying area 21, in a case of determining that an operation received by the touch panel 5 is an operation denoting the indication of the current position indicating icon 24.

According to the structure mentioned above, in a case of returning the current position using the current position indicating icon 24, the scroll displaying is performed until the displaying area 21 of the current position, and thus it is able to cause the user to recognize how far the current position is away. Therefore, when the user wants to access a position before returning the current position again, the user is able to take the direction, the time and the like of the scroll displaying as an indication to understand the position before returning. As a result, it is able to further improve the user interface in the information processor 1 which comprises the touch panel 5.

In the information processor 1, the controller 4 sets the displaying area 21 in the map 20 in such a way that the node icon which is set to be the current position is located at a center position in the direction of the scroll, in a case of determining that an operation received by the touch panel 5 is an operation denoting the indication of the current position indicating icon 24.

According to the structure mentioned above, in a case of using the current position indicating icon 24, the displaying area 21 is set in such a way that the current position is located at a center position. Therefore, in a case of displaying the displaying area 21 in which the current position is located by using the current position indicating icon 24, it is able to easily find the current position in the displaying area 21.

In the information processor 1, the controller 4 cancels the scroll displaying based on an operation in a case of determining that the operation received by the touch panel 5 is the operation denoting the indication of the current position indicating icon 24, when the current displaying area 21 includes the node icon 22 which is set to be the current position.

According to the structure mentioned above, in a case of returning the current position using the current position indicating icon 24, when the displaying area 21 in which the current position is located has been displayed, the scroll displaying is not performed. Therefore, it is able to inform that the displaying area 21 in which the current position is located has been displayed clearly.

In the information processor 1, the node icon 22 is highlighted, in a case of canceling the scroll displaying.

According to the structure mentioned above, in a case of returning the current position using the current position indicating icon 24 by the user, when the displaying area 21 in which the current position is located has been displayed, the scroll displaying is not performed but the node icon 22 of the current position is highlighted. Therefore, it is able to inform of the location of the current position in the displaying area 21 which has been displayed clearly.

A game program causes a computer which comprises a display 2 for displaying a screen, a touch panel 5 provided on the entire surface of the display 2 and receiving a touch input of a user to execute the following processes: a process of displaying the displaying area 21 set according to the screen in the display 2, in the map 20 having a plurality of node icons 22 on the path; a process of displaying the current position indicating icon 24 in the display 2; and for the operation received by the touch panel 5, when it is determined to be an operation denoting one of the plurality of node icons 22, a process of setting the one of the plurality of node icons 22 to be the current position based on this node icon 22; and for the operation received by the touch panel 5, when it is determined to be an operation denoting the current position indicating icon 24, a process of displaying the displaying area 21 in which the node icon 22 which is set to be the current position is located in the map 20 is displayed.

According to the structure mentioned above, in the map 20, even in a case of that the displaying area 21 is farther from the node icon 22 which is set to be the current position, the displaying area 21 for which the node icon 22 is set to be the current position is displayed through performing an operation denoting the current position indicating icon 24. Therefore, there is no need to search for the node icon 22 which is set to be the current position, and it is easy to display the node icon 22 which is set to be the current position.

As a result, it is able to improve the user interface in the information processor which comprises the touch panel 5.

A game control method is a game control method executed by a computer which comprises a display 2 for displaying a screen, a touch panel 5 provided on the entire surface of the display 2 and receiving a touch input of a user, and the computer executes the following processes: a process of displaying the displaying area 21 set according to the screen in the display 2, in the map 20 having a plurality of node icons 22 on the path; a process of displaying the current position indicating icon 24 in the display 2; and for the operation received by the touch panel 5, when it is determined to be an operation denoting one of the plurality of node icons 22, a process of setting the one of the plurality of node icons 22 to be the current position based on this node icon 22; and for the operation received by the touch panel 5, when it is determined to be an operation denoting the current position indicating icon 24, a process of displaying the displaying area 21 in which the node icon 22 which is set to be the current position is located in the map 20 is displayed.

According to the structure mentioned above, in the map 20, even in a case of that the displaying area 21 is farther from the node icon 22 which is set to be the current position, the displaying area 21 for which the node icon 22 is set to be the current position is able to be displayed through performing an operation denoting the current position indicating icon 24. Therefore, there is no need to search for the node icon 22 which is set to be the current position, and it is easy to display the node icon 22 which is set to be the current position.

As a result, it is able to improve the user interface in the information processor which comprises the touch panel 5.

Embodiments of the present invention thus described above solely serve as specific examples of the present invention, and are not to limit the scope of the present invention. The specific structures and the like are suitably modifiable. Further, the effects described in the embodiments of the present invention described in the above embodiment are no more than examples of preferable effects brought about by the present invention, and the effects of the present invention are not limited to those described hereinabove.

In addition, in the above detailed description, for the sake of easier understanding of the present invention, a description has been given focusing on the characteristic part. The present invention is not limited to the embodiment described in the detailed description above, but may be applied to other embodiments, and the applicable range is various. In addition, terms and phraseology used in the present specification are used to clearly describe present invention and are not intended to limit the explanation of present invention. In addition, other configurations, systems, methods, and the like included in the concept of the present invention can be easily derived from the concept of the invention described in the present specification as long as it is a person skilled in the art. Therefore, the description of the claims must be regarded as including equivalent structures without departing from the range of the technical idea of the present invention. In addition, the abstract is intended to allow those skilled in the art, such as in the patent offices and general public offices, who know a little about the legal terms or the professional term and the like, to determine the technical content of the present application and the nature thereof rapidly though a simple search. Accordingly, the abstract is not intended to limit the scope of the invention as evaluated by the claims. In addition, in order to fully understand the purpose of the present invention and the specific effects of the present invention, it is desirable to make full reference and explanation of the already-disclosed document and the like.

The above detailed description includes a process performed by the computer. The above description and the present invention have been written for the purpose of enabling those skilled in the art to understand most effectively. In the present specification, each process used to derive a result should be understood as processes which are not self-contradictory. In addition, in each process, electric or electromagnetic signals are received, transmitted, recorded, or the like. In the processing of each process, such signal is expressed by bit, value, symbol, word, term, number, and the like, but it should be noted that it is used only for the convenience of illustration. In addition, in the processing of each process, there is a case which is described by a common expression with human actions, however, the processes described in this specification are executed in principle by various devices. In addition, the other structure required for performing each process can be clarified by the above description.

What is claimed is:

1. An information processor, comprising:
a display for displaying a screen;
a touch panel disposed at an overall surface of the display and receiving a touch input of a user; and
a controller,
the controller being programmed to perform:
a process of displaying a displaying area set based on a screen on the display in a map which has a plurality of sequential node icons on a path, with a game element being associated with each of the node icons;
a process of displaying an indicating icon on the display;
a process of setting a certain one of the plurality of node icons to be a current position based on the node icon in a case that an operation received by the touch panel is determined to be an operation denoting the certain one of the plurality of node icons, with said process of setting being conditioned on satisfaction of a predetermined condition in one or more of the game elements associated with the node icons, including achieving a predetermined result of playing the game element associated with the node icon for the current position as a condition for being able to set a next-sequential icon to be the current position; and
a process of displaying a displaying area in which the node icon set to be the current position in the map is located, in a case that an operation received by the touch panel is determined to be an operation denoting the indicating icon;
wherein the controller performs a scroll displaying until displaying the set displaying area with the node icon set to be the current position located at a center position in a direction of the scroll, in a case that an operation received by the touch panel is determined to be an operation denoting the indicating icon;
wherein the controller cancels the scroll displaying based on the operation on condition that the current displaying area includes the node icon set to be the current position in a case that an operation received by the touch panel is determined to be an operation denoting the indicating icon, with satisfaction of the condition that the current displaying area includes the node icon set to be the current position being determined when the indicating icon is touched; and
wherein, in the case that the operation received by the touch panel is determined to be an operation denoting the indicating icon, the controller does not perform scroll displaying to cause the node icon set to be the current position to be located at a center position within the current displaying area when the current displaying area already includes the node icon set to be the current position even if the node icon which is set to be the current position is not located at the center position.

2. The information processor according to claim 1, wherein, if the current displaying area already includes the node icon set to be the current position when the indicating icon is denoted, the appearance of the node icon set to be the current position is changed as compared to its appearance prior to the indicating icon being denoted to highlight the node icon set to be the current position.

3. The information processor according to claim 1, further comprising an electronic data storage unit,
wherein whether the condition that the current displaying area includes the node icon set to be the current position is satisfied is determined with reference to data stored in the electronic data storage unit.

4. The information processor according to claim 3, wherein the data stored in the electronic data storage unit comprises one or more of position data of the node icons corresponding to coordinates of the map, data denoting the node icon which is set to be the current position, and data denoting the current displaying area.

* * * * *